(12) United States Patent
Hijikata

(10) Patent No.: US 7,689,361 B2
(45) Date of Patent: Mar. 30, 2010

(54) DRIVING OPERATION ASSISTING SYSTEM, METHOD AND VEHICLE INCORPORATING THE SYSTEM

(75) Inventor: Shunsuke Hijikata, Kamakura (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 845 days.

(21) Appl. No.: 11/263,958

(22) Filed: Nov. 2, 2005

(65) Prior Publication Data

US 2006/0116807 A1    Jun. 1, 2006

(30) Foreign Application Priority Data

Nov. 26, 2004    (JP)    ............................. 2004-341718

(51) Int. Cl.
G08G 1/16    (2006.01)

(52) U.S. Cl. ............................. 701/301; 701/1; 701/70; 701/93; 701/96; 701/300; 180/271; 180/274; 180/275; 180/276; 180/282; 340/901; 340/933; 340/425.5; 340/435; 340/436

(58) Field of Classification Search ................. 701/301, 701/45, 96
See application file for complete search history.

(56) References Cited

U.S. PATENT DOCUMENTS

| | | | |
|---|---|---|---|
| 6,362,729 B1 * | 3/2002 | Hellmann et al. ........... 340/436 |
| 6,856,882 B2 * | 2/2005 | Raab ........................... 701/70 |
| 6,882,915 B2 * | 4/2005 | Yamamura et al. ............ 701/45 |
| 6,917,872 B2 * | 7/2005 | Egami ........................ 701/96 |
| 7,015,805 B2 * | 3/2006 | Knoop et al. ............... 340/467 |
| 7,102,495 B2 * | 9/2006 | Mattes et al. ............... 340/435 |
| 7,124,010 B2 * | 10/2006 | Egami ........................ 701/93 |

(Continued)

FOREIGN PATENT DOCUMENTS

JP    11-048884    2/1999

(Continued)

OTHER PUBLICATIONS

Machine Translation of Takashi, JP 2001-199296 A, Jul. 2001.*

(Continued)

*Primary Examiner*—Khoi Tran
*Assistant Examiner*—Jonathan Sample
(74) *Attorney, Agent, or Firm*—McDermott Will & Emery LLP

(57) ABSTRACT

A driving assisting system for assisting a driver in operating a vehicle. The system includes a detection assembly configured to obtain environment information related to an environment around the vehicle. A risk potential calculation device is provided to calculate risk potential associated with the vehicle based on the environment information. A controller causes a reaction force determined based on the calculated risk potential to be transmitted to the driver via an operator controlled input device in response to the calculated risk potential being a first type of risk potential, and causes a pressure force determined based on the calculated risk potential to be transmitted to the driver via equipment of the vehicle in response to the calculated risk potential being a second type of risk potential. The operator controlled input device is used by the driver to control the driving of the vehicle, and the equipment is different from the operator controlled input device.

12 Claims, 16 Drawing Sheets

U.S. PATENT DOCUMENTS

| | | | |
|---|---|---|---|
| 7,145,441 B2 * | 12/2006 | Knoop et al. | 340/435 |
| 7,200,481 B2 * | 4/2007 | Yamamura et al. | 701/96 |
| 2003/0101805 A1 * | 6/2003 | Raab | 73/116 |
| 2004/0039513 A1 * | 2/2004 | Knoop et al. | 701/70 |
| 2004/0153217 A1 * | 8/2004 | Mattes et al. | 701/1 |
| 2004/0216939 A1 * | 11/2004 | Lorenz et al. | 180/268 |
| 2005/0012602 A1 * | 1/2005 | Knoop et al. | 340/435 |
| 2005/0033517 A1 * | 2/2005 | Kondoh et al. | 701/301 |
| 2005/0090984 A1 * | 4/2005 | Kobayashi et al. | 701/301 |
| 2005/0110348 A1 * | 5/2005 | Hijikata et al. | 307/10.1 |
| 2006/0041381 A1 * | 2/2006 | Simon et al. | 701/301 |
| 2006/0178789 A1 * | 8/2006 | Kuge | 701/1 |
| 2006/0195231 A1 * | 8/2006 | Diebold et al. | 701/1 |

FOREIGN PATENT DOCUMENTS

| | | |
|---|---|---|
| JP | 2000-225877 | 8/2000 |
| JP | 2001-199296 * | 7/2001 |
| JP | 2001199296 * | 7/2001 |
| JP | 2001-341599 | 12/2001 |
| JP | 2002-019485 | 1/2002 |
| JP | 2003-306107 A | 10/2003 |
| JP | 2004-067070 | 3/2004 |

OTHER PUBLICATIONS

U.S. Appl. No. 11/146,081, filed Jun. 7, 2005, Shunsuke Hijikata et al.

Japanese Office Action, with English translation, issued in Japanese Patent Application No. JP 2004-341718, mailed Mar. 17, 2009.

* cited by examiner

STATE A

STATE B

STATE C

FIG.21
| SHIFT MODE | | DIRECTION OF CHANGE | LOW LISK REGION | HIGH LISK REGION |
|---|---|---|---|---|
| CA | AFTER DEPRESSION OF ACC. PEDAL | $-\Delta Fc$ | SLOW CHANGE | SLOW CHANGE |
| AC | AFTER RELASE OF ACC. PEDAL | $+\Delta Fc$ | SLOW CHANGE | QUICK CHANGE |
| CB | AFTER DEPRESSION OF BRAKE PEDAL | $-\Delta Fc$ | SLOW CHANGE | QUICK CHANGE |
| BC | AFTER RELASE OF BRAKE PEDAL | $+\Delta Fc$ | SLOW CHANGE | SLOW CHANGE |
FIG.22
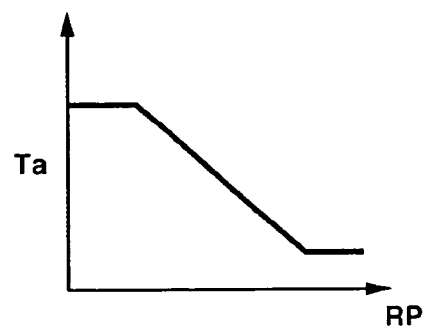
FIG.23
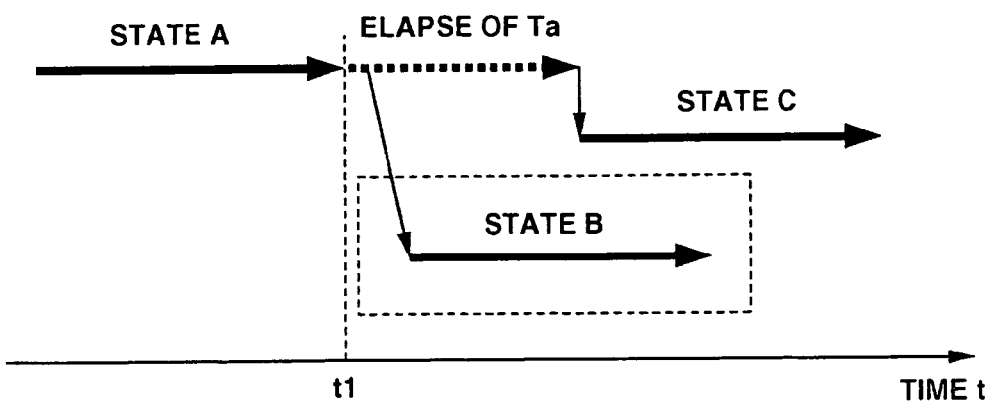

DRIVING OPERATION ASSISTING SYSTEM, METHOD AND VEHICLE INCORPORATING THE SYSTEM

RELATED APPLICATION

This application claims the benefit of priority from Japanese Patent Application No. 2004-341718, filed Nov. 26, 2004, the disclosure of which is incorporated by reference in its entirety.

FIELD OF THE DISCLOSURE

This disclosure relates to a system and method for assisting a driver in operating a vehicle, and a vehicle incorporating the system, and more specifically, to methods and systems that provide driving information to the driver via different portions of a vehicle based on the types of risks.

BACKGROUND OF THE DISCLOSURE

JP2003-306107A discloses a driving operation assisting system, which transmits information regarding an approaching status of a vehicle approaching the preceding vehicle to an operator using a haptic signal via equipment of the vehicle. The equipment is different from a device that the operator uses to control the driving of the vehicle, such as a steering wheel. According to this known system, the driver's seat moves to the rear immediately after a distance to the preceding vehicle becomes less than a predetermined value. One other driving operation assisting system transmits information on lateral position of a vehicle within a lane via haptic signals from a driver's seat.

Using the conventional systems, it is difficult for an operator to recognize an amount of risk from the preceding vehicle even though the approaching of the preceding vehicle can be clearly transmitted to the operator via reward motion of the driver's seat. Some systems attempt to transmit information of various different levels of risks to the operator via one or any combination of different pressing forces from different portions of the driver's seat. However, a need remains for an improved information conveyance that prompts an operator of a vehicle to perform an appropriate driving operation in response to different levels of risks as well as more intelligible conveyance of magnitudes of the risks to the operator.

SUMMARY OF THE DISCLOSURE

This disclosure describes driving assisting methods and systems that provide driving information to the driver via different portions of a vehicle based on different types or levels of risks.

An exemplary system for assisting a driver in operating a vehicle includes a detection assembly configured to obtain environment information related to an environment around the vehicle, and a risk potential calculation device configured to calculate risk potential associated with the vehicle based on the environment information. A controller is provided to cause a reaction force determined based on the calculated risk potential to be transmitted to the driver via an operator controlled input device in response to the calculated risk potential being a first type of risk potential, and to cause a pressure force determined based on the calculated risk potential to be transmitted to the driver via equipment of the vehicle in response to the calculated risk potential being a second type of risk potential. The operator controlled input device is used by the driver to control the driving of the vehicle, and the equipment is different from the operator controlled input device and not used by the driver to enter the control input for operating the vehicle. In one aspect, the operator controlled input device is an accelerator pedal, and the equipment is a driver's seat occupied by the driver. The system may further include a manipulation judgment device configured to judge an operation state of the accelerator pedal being manipulated by the driver and an operation state of a brake pedal being manipulated by the driver. The pressing force is regulated in response to the judged state of the accelerator pedal and the judged state of the brake pedal. When a judgment result of the manipulation judgment device indicates that the accelerator pedal is being manipulated or both of the accelerator pedal and brake pedal are not being manipulated, the pressing force transmitted to the driver via the driver's seat increases as the risk potential increases. When the judgment result of the manipulation judgment device indicates that the brake pedal is being manipulated, the pressing force transmitted to the driver via the driver's seat drops as the risk potential increases.

The system may include a reaction force generator configured to regulate the reaction force transmitted to the driver via the operator controlled input device in response to a first control signal generated by the controller, and a pressing force generator configured to regulate pressing force transmitting to the driver via the equipment of the vehicle in response to a second control signal generated by the controller. In one embodiment, the calculated risk potential is classified as the first type of risk potential when the calculated risk potential is determined to fall in a high risk region, and the calculated risk potential is classified as the second type of risk potential when the calculated risk potential is determined to fall in a low risk region. In one aspect, the pressing force is transmitted to the driver via the equipment according to different values of the risk potential when the risk potential falls in an upper limit boundary portion of the high risk region. In another aspect, the system the system transmits the reaction force to a first portion of the driver's body via the operator controlled input device, in response to the calculated risk potential being a first type of risk potential, and transmits the pressure force to a second portion of the driver's body via the equipment, in response to the calculated risk potential being the second type of risk potential.

According to another embodiment, the reaction force transmitted to the driver via the operator controlled input device remains substantially unchanged with different values of the risk potential responsive to the calculated risk potential being the second type of risk potential, and the pressing force transmitted to the driver via the equipment remains substantially unchanged with different values of the risk potential responsive to the calculated risk potential being the first type of risk potential.

According to still another embodiment, an exemplary system for assisting a driver in operating a vehicle. The driver uses an operator controlled input device to enter a control input for operating the vehicle. The system comprises a detection assembly configured to detect a running environment around the vehicle, and a judgment device configured to judge an operation state of the operator controlled input device being manipulated by the driver. A risk potential calculation device is provided to calculate risk potential associated with the vehicle based on the detected running environment. A controller regulates a pressing force transmitted to the driver via equipment of the vehicle based on the calculated risk potential and the judged operation state of the operator controlled input device. The equipment is a device different from the operator controlled input device and not used by the driver to enter a control input for operating the vehicle. In one aspect, the equipment is a driver's seat occupied by the driver.

According a further embodiment, a vehicle includes an operator controlled input device used by a driver in controlling the driving of the vehicle, and equipment of the vehicle. The equipment is different from the operator controlled input device and not used by the driver to enter an input for controlling the driving of the vehicle. The vehicle has a driving assisting system comprising a detection assembly configured to obtain environment information related to an environment around the vehicle, and a risk potential calculation device configured to calculate risk potential associated with the vehicle based on the environment information. A controller is provided to cause a reaction force determined based on the calculated risk potential to be transmitted to the driver via the operator controlled input device in response to the calculated risk potential being a first type of risk potential, and to cause a pressure force determined based on the calculated risk potential to be transmitted to the driver via the equipment of the vehicle in response to the calculated risk potential being a second type of risk potential. In one aspect, the operator controlled input device is an accelerator pedal and the equipment is a driver's seat occupied by the driver.

According to another aspect, the calculated risk potential is classified as the first type of risk potential when the calculated risk potential is determined to fall in a high risk region, and the calculated risk potential is classified as the second type of risk potential when the calculated risk potential is determined to fall in a low risk region.

According to still another embodiment, a vehicle includes an operator controlled input device used by a driver to control the driving of the vehicle, and equipment of the vehicle, wherein the equipment is different from the operator controlled input device and not used by the user in entering a control input for operating the vehicle. The vehicle further includes a driving assisting system that includes a detection assembly configured to detect a running environment around the vehicle, and a judgment device configured to judge an operation state of the operator controlled input device being manipulated by the driver. A risk potential calculation device is provided to calculate risk potential associated with the vehicle based on the detected running environment. A controller configured to regulate a pressing force transmitted to the driver via the equipment of the vehicle based on the calculated risk potential and the judged operation state of the operator controlled input device.

According to still another embodiment, a driving assisting method for assisting a driver in operating a vehicle detects a running environment around the vehicle. The driver uses an operator controlled input device to enter a control input for controlling the driving of the vehicle. An operation state of the operator controlled input device is determined. Risk potential associated with the vehicle is calculated based on the detected running environment. A pressing force transmitted to the driver via equipment of the vehicle is regulated based on the calculated risk potential and the judged state of operation performed by the driver. The equipment is a device different from the operator controlled input device and not used by the driver to enter a control input for operating the vehicle.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

FIG. 21 is a table containing various changes in a pressing force from the front edge portion of the driver's seat for different shift modes.

FIG. 22 illustrates a predetermined period of time Ta changing with different values of the risk potential RP.

FIG. 23 illustrates a shift from state A to state C (shift mode AC) as compared to a shift from state A to state B.

DETAILED DESCRIPTION OF THE DISCLOSURE

Various exemplary embodiments according to the present disclosure are described hereunder in detail with suitable reference to the accompanying drawings.

First Exemplary Embodiment

Figure 1:
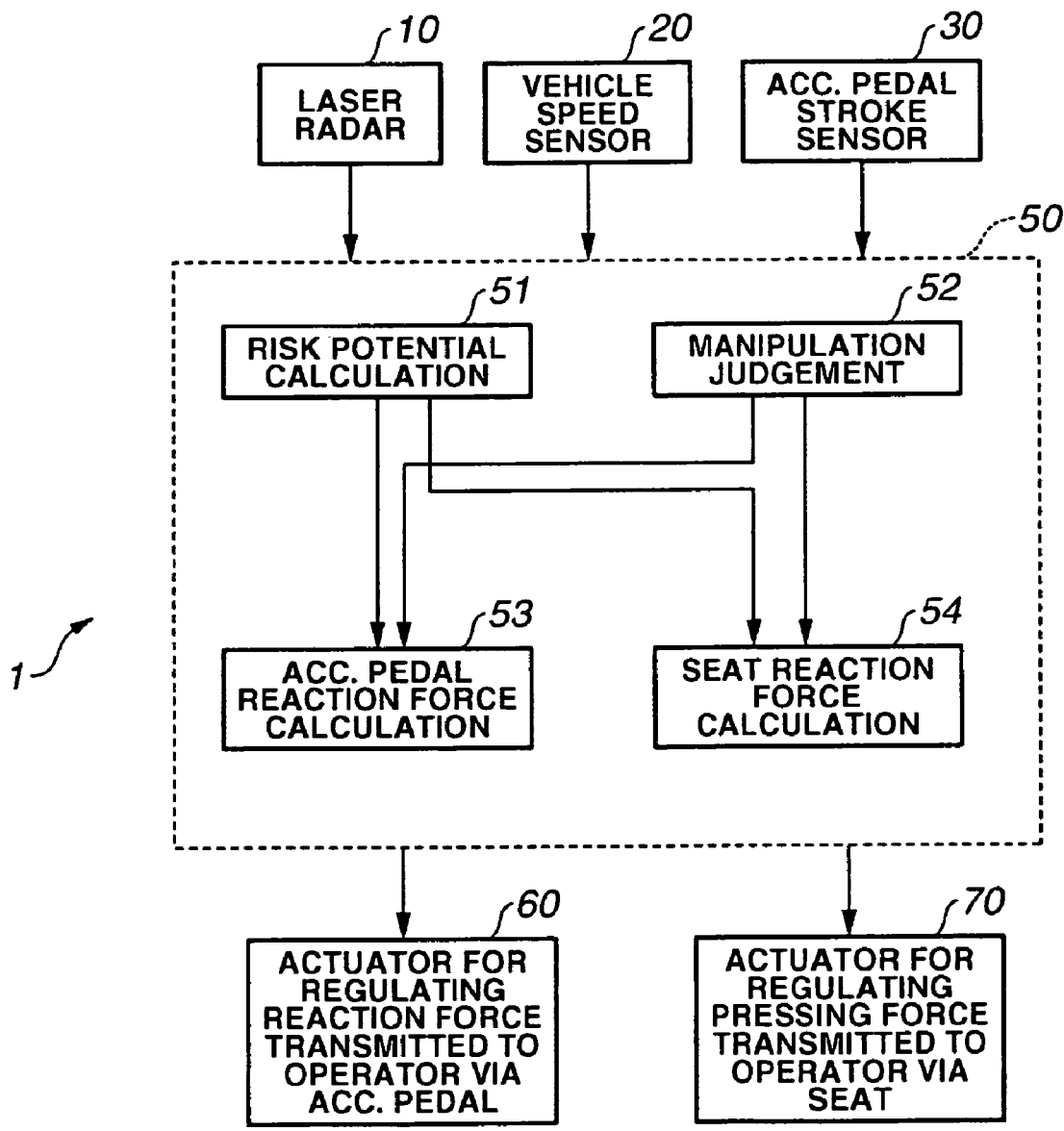
FIG. 1 is a block diagram incorporating a first exemplary embodiment of a system and method for assisting a driving operation of a vehicle according to the present disclosure.
Figure 2:
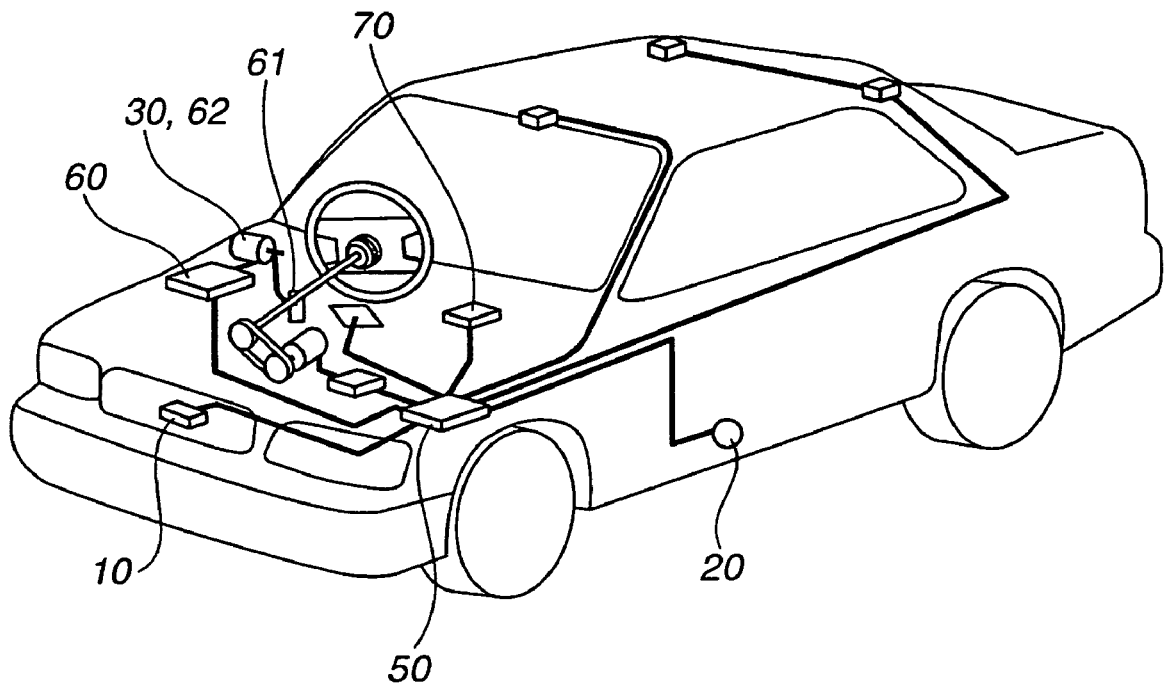
FIG. 2 is a perspective view of a vehicle with the system shown in FIG. 1.

Referring to FIG. 1 shows a first exemplary system 1 for assisting a driver in operating a vehicle. FIG. 2 illustrates an exemplary automobile installed with the driving assisting system 1.

The system 1 comprises a running environment detection assembly configured to detect a running environment around the vehicle. The running environment detection assembly includes, in the exemplary embodiment, laser radar 10 and a vehicle speed sensor 20.

The laser radar 10 is positioned at a center of a front grill or a front bumper of the vehicle for transmitting infrared pulsed beam horizontally to scan a measurement region in front of the vehicle. The laser radar 10 measures reflected waves of the transmitted infrared beam returning from obstacles inside the measurement region, such as rear ends of the preceding vehicles, and detects an inter-vehicle distance between the vehicle and each of the preceding vehicles and a relative speed between them by analyzing arrival time of the reflected waves. The laser radar 10 provides the detected inter-vehicle distance and relative speed to a controller 50. The laser radar 10 swivels the transmitted infrared pulsed beam horizontally and laterally about 6 degrees to each side of a longitudinal line passing through the center of the vehicle.

The vehicle speed sensor 20 detects a vehicle speed of the own vehicle by measuring a revolution per minute (rpm) of at least one wheel or a revolution per minute of an output member of a transmission, and provides the detected vehicle speed to the controller 50.

The controller 50, which is responsible for information processing within the driving operation assisting system 1, contains a microprocessor including a central processing unit (CPU), a read only memory (ROM), and a random access memory (RAM). The controller 50 includes, for example, software implementation of a risk potential calculation device 51, a manipulation judgment device 52, an accelerator pedal reaction force calculation device 53, and a seat reaction force calculation device 54.

The risk potential calculation device 51 is configured to calculate risk potential RP around the own vehicle based on the detected running environment. In particular, the risk potential calculation device 51 calculates the risk potential RP around the own vehicle based on input signals from the laser radar 10 and vehicle speed sensor 20. The manipulation judgment device 52 is configured to judge a state of an accelerator pedal 61, which will be later described. For instance, based on an input signal from an accelerator pedal stroke sensor 30, the manipulation judgment device 52 judges a state of the accelerator pedal 61 being manipulated by an operator operating the own vehicle.

Based on the risk potential RP calculated by the risk potential calculation device 51 and the state of accelerator pedal 61 judged by the manipulation judgment device 53, the accelerator pedal reaction force calculation device 53 calculates a control amount that controls the generation of reaction force to be transmitted to the operator from the accelerator pedal 61. In response to the calculated risk potential RP and the state of the accelerator pedal 61, the seat reaction force calculation device 54 calculates a pressing force to be transmitted to the operator from a driver's seat 71, which will be later described, occupied by the operator.

The controller 50 generates a first control signal in response to the control amount calculated by the accelerator pedal reaction force calculation device 53, and a second control signal in response to the pressing force calculated by the seat reaction force calculation device 54. The first control signal is fed to a reaction force generator in the form of an actuator 60 for regulating the reaction force transmitted to the operator via the accelerator pedal 61. The reaction force generator is configured to regulate a reaction force transmitted to the operator via an operator controlled input device in response the first control signal. In the exemplary embodiment, the operator controlled input device is in the form of the accelerator pedal 61. The second control signal is fed to a pressing force generator in the form of a seat actuator 70 for regulating a pressing force transmitted to the operator via the seat 71. The pressing force generator is configured to regulate a pressing force transmitted to the operator via equipment of the vehicle, which is different from the operator controlled input device in response to the second control signal. In the exemplary embodiment, the equipment is the seat 71.

Figure 3:
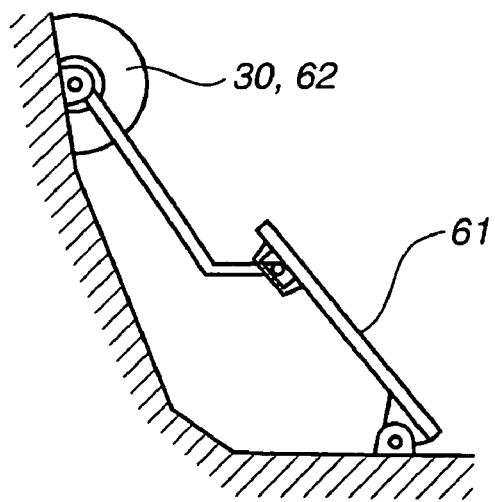
FIG. 3 is a diagram illustrating an operator controlled input device in the form of an accelerator pedal.

In response to the first control signal from the controller 50, the actuator 60 regulates the reaction force transmitted to the operator from the accelerator pedal 61 being manipulated by the operator. The actuator 60 regulates a servo motor 62 of the accelerator pedal 61. As shown in FIG. 3, the accelerator pedal 61 has a link mechanism incorporating the servo motor 62 and the accelerator pedal stroke sensor 30. The servo motor 62 may provide any desired torque and any desired angular position in response to instructions from the actuator 60. The accelerator pedal stroke sensor 30 detects an accelerator pedal stroke or an operation amount S of the accelerator pedal 61 by measuring a rotary angle of the servo motor 62. The rotary angle of the servo motor 62 corresponds to the operation amount S of the accelerator pedal 61 because the servo motor 180 and the accelerator pedal 160 are interconnected by the link mechanism.

Without the above-mentioned regulation of reaction force by the actuator 60, the reaction force transmitted to the operator from the accelerator pedal 61 increases linearly as the operation amount S increases. This ordinary reaction force varying characteristic is accomplished by a spring force provided by a torque spring arranged at the center of rotational movement of the accelerator pedal 61.

Figure 4:
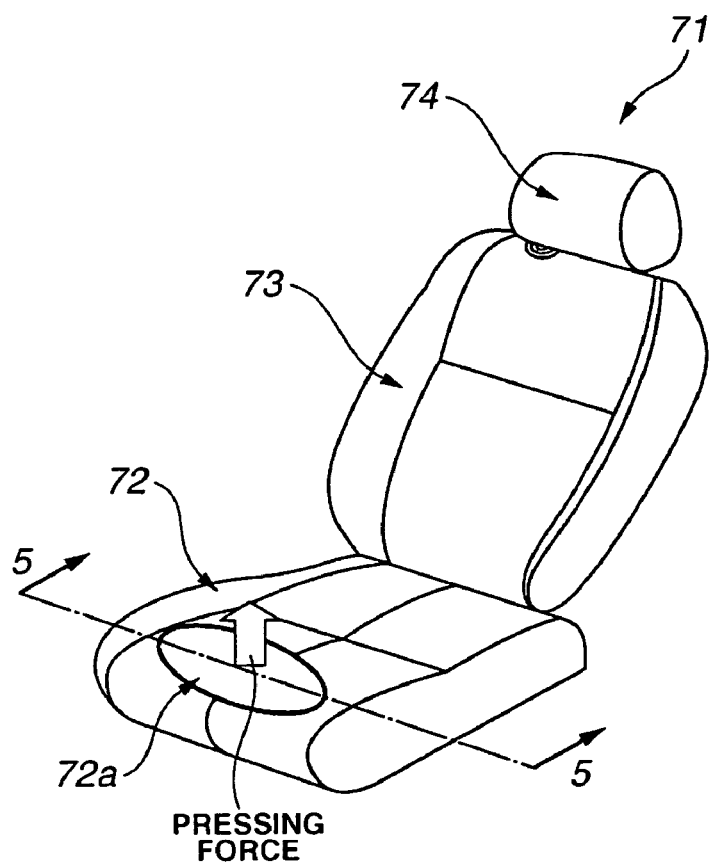
FIG. 4 is a perspective view of equipment of the vehicle in the form of a driver's seat.
Figure 5:
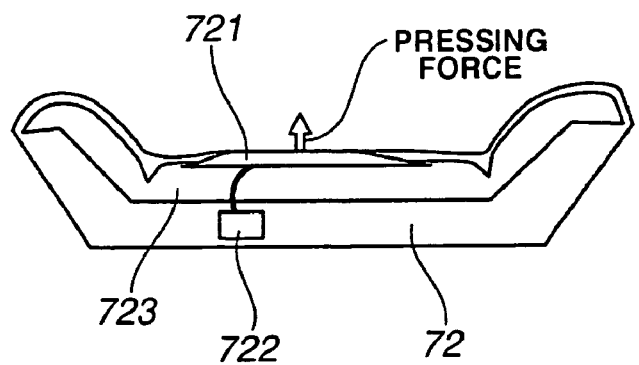
FIG. 5 is a cross section view from the line 5-5 in FIG. 4.

In response to the second control signal from the controller 50, the seat actuator 70 regulates the pressing force transmitted to the operator from a front edge portion 72a of a cushion 72 of the seat 71 (see FIG. 4). FIGS. 4 and 5 illustrates, as equipment of the vehicle, the driver's seat 71 operatively associated with the seat actuator 70.

As shown in FIG. 4, the seat 71 includes cushion 72, a seat back 73 and a head rest 74. Referring to FIG. 5, the seat actuator 70 is described below.

As shown in FIG. 5, the seat actuator 70 includes an air bag 721 embedded in the cushion 72 beneath the surface of the front edge portion 72a of the cushion 72. The seat actuator 70 also includes a pressure pump 722 and a pressure sensor 723. Under the control of the controller 50, the pressure pump 722 is operative to adjust an internal pressure of the air bag 721. The pressure sensor 723 is arranged to detect the internal pressure of the air bag 721 and generates a sensor signal. The sensor signal indicative of the detected pressure is fed to the controller 50. Adjusting the internal pressure of the air bag 721 can vary the pressing force imparted to the rear of the femoral region of a right leg of the operator via the front edge portion 72a of the cushion 72.

Figure 6:
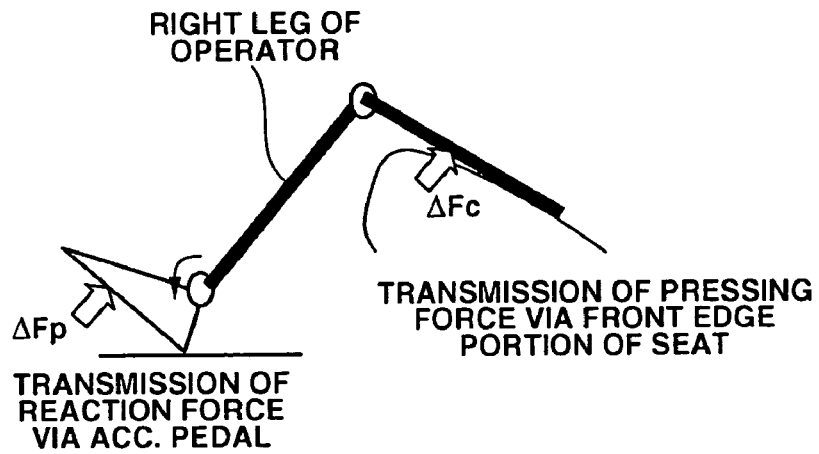
FIG. 6 illustrates conveyance of information to a right leg of the operator.

In the exemplary embodiment, the risk potential RP around the own vehicle is transmitted to the operator via haptic inputs from two interfaces, namely, the accelerator pedal 61 and the front edge portion 72a of the cushion 72 of the seat 71. As shown in FIG. 6, the operator receives a reaction force ΔFp from the accelerator pedal 61 and a pressing force ΔFc from the seat 71. The accelerator pedal 61 is an operation system interface, which the operator manipulates for a driving operation. The front edge portion 72a is a non-operation system interface, which the operator will not manipulate for the driving operation.

The information on the risk potential RP is transmitted to the operator from the non-operation system interface when the risk potential RP is classified into a low risk region. Under this condition, the information transmission to the operator from the operation system interface is restricted to avoid interference with driving operation by the operator. When the risk potential RP is classified into a high risk region, the information on the risk potential RP is transmitted to the operator from the operation system interface to prompt the operator to perform a driving operation in a direction to increase safety as well as transmitting an increase in the risk potential to the operator.

Using the operation and non-operation system interfaces in the above-mentioned manner allows a continuous transmission of different levels of risk potential RP to the operator. But, appropriate transmission of information on the risk potential RP is carried out based on the level of the risk potential RP and a state of manipulation by the operator without giving a confusion and/or a sense of incompatibility to the operator of the vehicle due to two haptic inputs of different kinds from the two different interfaces.

Figure 7:
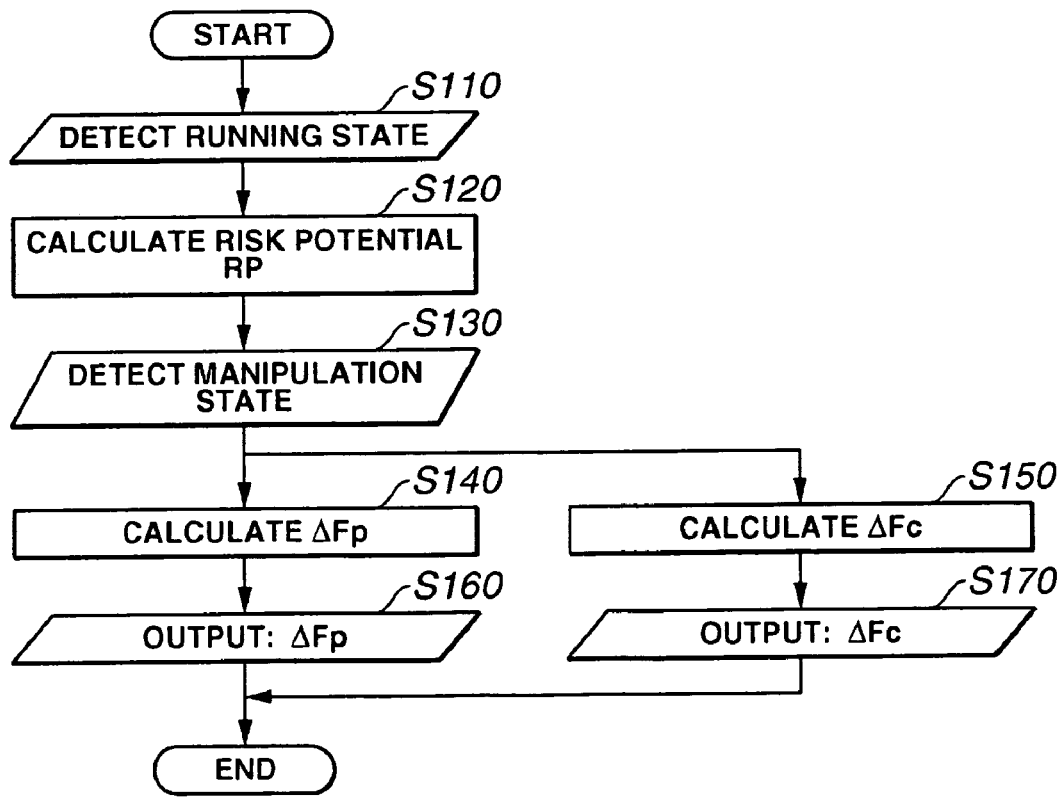
FIG. 7 is a flow chart illustrating an operation of the exemplary embodiment.

Next, the following descriptions provide more detailed descriptions on the driving operation assisting system 1 in connection with FIG. 7. FIG. 7 is a flow chart illustrating steps of a driving operation assisting control program stored in the controller 50. The execution of the control program is repeated at regular intervals of, for example, 50 milliseconds.

In FIG. 7, step S110 is provided to detect a running state or environment in a field around the own vehicle. In particular, at step S110, the controller 50 receives signals from the laser radar 10 and vehicle speed sensor 20 by reading operations to acquire data regarding the vehicle's status and the vehicle's running environment. Imaging a traffic scene where the own vehicle is following the preceding vehicle, for example, the controller 50 reads in a vehicle speed Va of the own vehicle, a distance D to the preceding vehicle, namely, an inter-vehicle distance D, and a relative speed Vr between the own vehicle and the preceding vehicle. The relative speed Vr may be expressed as a subtraction of a vehicle speed Vf of the preceding vehicle from the vehicle speed Va of the own vehicle (Vr=Va−Vf).

At step S120, the controller 50 calculates risk potential RP around the own vehicle based on the running state or environment data obtained at step S110. In the exemplary embodiment, the controller 50 calculates a time to collision TTC and time headway THW with respect to the preceding vehicle.

The time to collision TTC is a measurement of time from a present or current moment to a future moment when the distance D would become zero if the relative speed Vr to the preceding vehicle remains unaltered. The TTC may be expressed as:

$$TTC=D/Vr \quad \text{(Eq. 1)}$$

The smaller the value of TTC, the more imminent the collision is and the larger the value of an extent the own vehicle has approached the preceding vehicle is. In the traffic scene where the own vehicle is following the preceding vehicle, most vehicle operators perceive a high degree of risk and initiate deceleration to avoid collision well before the TTC becomes less than 4 seconds. The TTC is a good indication for predicting a future behavior the vehicle operator might take. However, when it comes to quantifying the degree of risk, which the vehicle operator actually perceives, there is a discrepancy between the TTC and the degree of risk. Thus, the TTC alone is insufficient to quantify the degree of risk.

Such a discrepancy may be confirmed by considering a traffic scene where the relative speed Vr is zero. In this case, the TTC is infinite irrespective of how narrow the distance D is. However, the vehicle operator very often perceives an increase in the degree of risk in response to a reduction in the distance D, accounting for an increase in influence on the TTC by an unpredictable drop in a vehicle speed of the preceding vehicle.

To address the above-mentioned discrepancy, the notion of time headway THW has been introduced to quantify an increase how in influence on the TTC by an unpredictable drop in the vehicle speed of the preceding vehicle. The THW is a measure of a timer that is set to count up when the preceding vehicle reaches a point on a road and will be reset subsequently when the following own vehicle will reach the same point. The THW is expressed as, $$THW=D/Va \qquad (Eq. 2)$$

In the case where the host vehicle is following the preceding vehicle, the vehicle speed Vf of the preceding vehicle may be used instead of the vehicle speed Va in the above-mentioned equation (Eq. 2).

The relationship between the two notions TTC and THW is such that a change in vehicle speed Vf, if any, of the preceding vehicle results in a small change in the TTC when the THW is long, but the same change in vehicle speed Vf of the preceding vehicle results in a large change in the TTC when the THW is short.

Using the time to contact TTC and time headway THW, a risk potential RP with respect to the preceding vehicle is calculated. The risk potential RP may be expressed as:

$$RP=a/THW+b/TTC \qquad (Eq. 3)$$

In the above equation, b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including the host vehicle is following the preceding vehicle. In this exemplary implementation, b=8 and a=1.

At step S130, the controller 50 receives, as an input, the operation amount S of the accelerator pedal 61 by reading operation of the output of the accelerator pedal stroke sensor 30 and detects the manipulation state of the accelerator pedal 61 by judging whether or not the operator is manipulating or depressing the accelerator pedal 61. If it is judged that the operator is manipulating the accelerator pedal 61, the information transmission via the accelerator pedal 61 and the front edge portion 72a of the cushion 72 is carried out. If it is judged that the operator is not manipulating or releasing the accelerator pedal 61, the information transmission via the front edge portion 72a of the cushion 72 is carried out.

Figure 8:
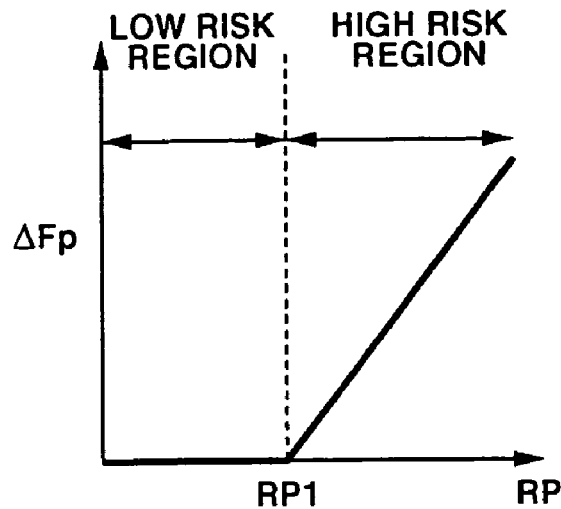
FIG. 8 illustrates, in the fully drawn line, values of an increase $\Delta Fp$ in reaction force from the accelerator pedal with different values of risk potential RP.

At step S140, the controller 50 calculates a reaction force transmitted to the operator from the accelerator pedal 61 based on the risk potential RP calculated at step S120 and the judgment made at step S130. FIG. 8 shows values of an increase ΔFp in accelerator pedal reaction force relative to different values of risk potential RP. In FIG. 8, the risk potential RP is classified into a low risk region when it is less than or equal to a predetermined value RP1, and is classified into a high risk region when it exceeds the predetermined value RP1. The predetermined value RP1 is a threshold that has been appropriately determined beforehand to classify the risk potential RP, as expressed by the equation (Eq. 3), with respect to the preceding vehicle into the low risk region or the high risk region.

In the low risk region, the risk potential RP is not transmitted to the operator via the accelerator pedal 61 by setting the increase ΔFp in accelerator pedal reaction force equal to 0 (ΔFp=0). In the high risk region, the increase ΔFp in accelerator pedal reaction force increases as the risk potential RP increases. Because transmission of information via the accelerator pedal 61 less effective when the operator is releasing the accelerator pedal 61, the increase ΔFp in accelerator pedal reaction force is set equal to 0 (ΔFp=0) regardless of the magnitude of the risk potential RP.

At step S150, the controller 50 calculates a pressure force transmitted to the operator from the front edge portion 72a of the cushion 72 based on the risk potential RP. As the air bag 721 beneath the front edge portion 72a of the cushion 72 is pressurized to a predetermined value of internal pressure to hold the seat occupant appropriately and comfortably, the controller 50 calculates an increase in pressing force in addition to the predetermined value of internal pressure as a reaction force ΔFc transmitted to the operator from the front edge portion 72a of the cushion 72.

Figure 9:
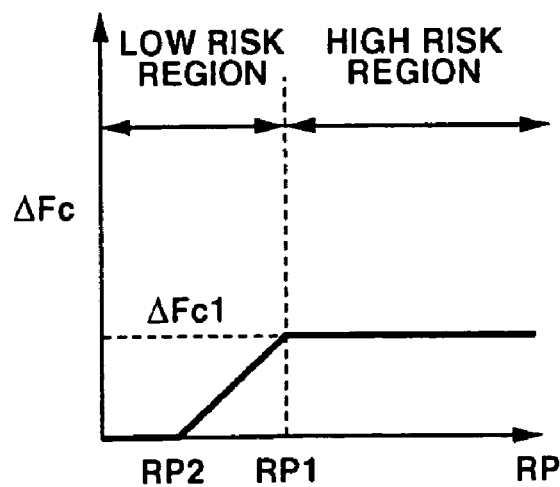
FIG. 9 illustrates, in the fully drawn line, values of a pressing force $\Delta Fc$ from a front edge portion of the driver's seat with different values of risk potential RP.

FIG. 9 shows values of the reaction force ΔFc relative to different values of risk potential RP. In the low risk region, the reaction force ΔFc increases gradually after the risk potential RP has exceeded a predetermined value RP2. In the high risk region, the reaction force Fc is set unchanged at a predetermined value ΔFc1. The map as illustrated by the fully drawn varying characteristic in FIG. 9 gives various values of the reaction force ΔFc relative to different values of the risk potential RP irrespective of the state of accelerator pedal 61.

At step S160, the controller 50 provides, as an output, the increase ΔFp in accelerator pedal reaction force given at step S140. The first control signal reflecting this increase ΔFp is fed from the controller 50 to the actuator 60. In response to the first control signal, the actuator 60 regulates the reaction force transmitted to the operator from the accelerator pedal 61 by regulating the servo motor 62.

At step S170, the controller 50 provides, as an output, the reaction force ΔFc given at step S150. The second control signal reflecting this reaction force ΔFc is fed from the controller 50 to the seat actuator 70. In response to the second control signal, the seat actuator 70 regulates the pressing force transmitted to the rear of the femoral region of the operator by adjusting the internal pressure of the air bag 721.

Figure 10:
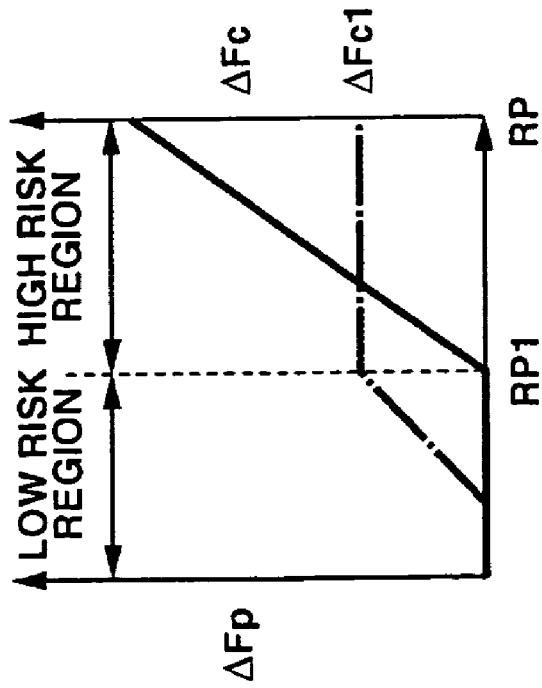
FIG. 10 illustrates, in the fully drawn line, the increase $\Delta Fp$ in reaction force from the accelerator pedal with different values of risk potential RP, and illustrates, in the one-dot chain line, the pressing force $\Delta Fc$ from the front edge portion of the driver's seat changing with different values of risk potential RP when the accelerator pedal is being manipulated.

The exemplary embodiment of the diving operation assisting system 1 operates as follows:

When the operator is manipulating the accelerator pedal 61, in the low risk region, the reaction force ΔFc from the front edge portion 72a increases gradually as shown by the one-dot chain line in FIG. 10 as the reaction force RP increases. In the low risk region, the increase ΔFp in reaction force is always set equal to 0 (ΔFp=0). In the high risk region, the reaction force ΔFc is set unchanged at the predetermined value ΔFc1, while the increase ΔFp increases gradually as shown by the fully drawn line in FIG. 10 as the reaction force RP increases.

As described above, different levels of the risk potential RP are transmitted to the operator only from the seat 71 by varying the reaction force ΔFc when the risk potential RP falls in the low risk region. When the risk potential RP falls in the high risk region, the reaction force ΔFc stays unchanged at the predetermined value ΔFc1 thereby keeping the amount of information transmitted to the operator from the seat 71 constant, and different levels of the risk potential RP are transmitted to the operator only from the accelerator pedal 61 by varying the increase ΔFc in the reaction force. In the low risk region, using the non-operation system interface in the form of the front edge portion 72a of the seat cushion 72 has made it possible to transmit information to the operator without interfering with driving operation by the operator and without increasing a sense of incompatibility which the operator might have.

In the high risk region, using the operation system interface in the form of the accelerator pedal 61 has made it possible to provide a prompt to the operator to perform a driving operation in an appropriate way to reduce the risk. That is, increasing the reaction force from the accelerator pedal 61 in response to an increase in risk potential RP presses the foot of the operator in a direction toward the released position of the accelerator pedal 61, directly transmitting a need to release the accelerator pedal 61 to the operator. In this scenario, keeping the pressing force transmitted to the operator from the front edge portion 72a unchanged reduces the probability of creating confusion and/or a sense of incompatibility to the operator. The pressing force from the front edge portion 72a raises the femoral region of the right leg of the operator provide a bias to the operator in a direction of releasing the accelerator pedal 61 when the risk potential RP falls in the high risk region.

Figure 11:
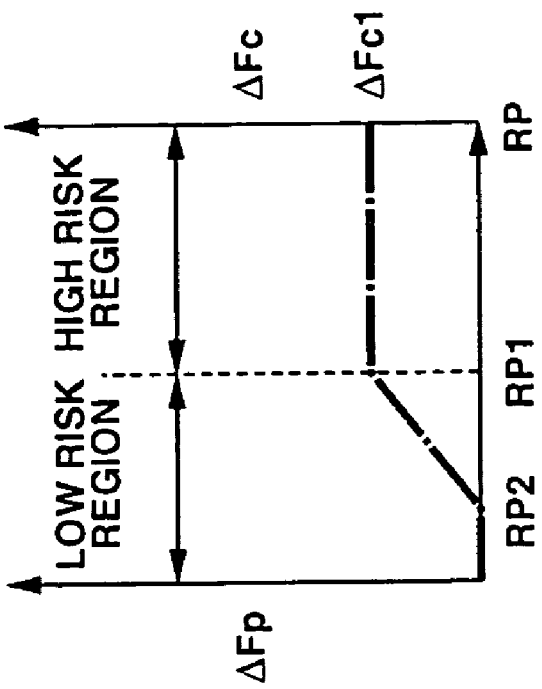
FIG. 11 illustrates, in the one-dot chain line, the pressing force $\Delta Fc$ from the front edge portion of the driver's seat changing with different values of risk potential RP when the accelerator pedal is released or not being manipulated.

When the operator is not manipulating the accelerator pedal 61, the reaction force ΔFc transmitted to the operator from the front edge portion 72a varies in response to the risk potential RP as indicated by the illustrated one-dot chain line in FIG. 11. This ensures transmission of varying of the risk potential RP to the operator even when the operator is not manipulating the accelerator pedal 61. As is readily seen from the one-dot chain line illustrated in FIGS. 10 and 11, the varying of reaction force ΔFc with different values of the risk potential RP remains the same against a shift in the state of accelerator pedal 61, giving no confusion to the operator.

The first exemplary embodiment described above provides the following effects:

(1) The driving operation assisting system 1 calculates risk potential RP based on a running environment in a field around the own vehicle and transmits the risk potential RP to the operator of the own vehicle via a reaction force from an operator controlled input device for driving operation and via a pressing force from a vehicle mount equipment different from the operator controlled input device. Using a predetermined value RP1 as a threshold allows classification of the risk potential RP into a low risk region or a high risk region. In the low risk region, the driving operation assisting system 1 varies the pressing force from the vehicle mount equipment with different values of the risk potential RP. In the high risk region, it varies the reaction force from the operator controlled input device with different values of risk potential RP. The driving operation assisting system 1 ensures intelligible transmission of the current level of the risk potential RP to the operator by continuously transmitting the risk potential RP to the operator over the low and high risk regions through two different tools of information transmission. In the low risk region, a driving operation by the operator will not be interfered because the vehicle mount equipment different from the operator controlled input device is used for transmission of the risk potential RP to the operator. In the high risk region, the use of the operator controlled input device for transmission of risk potential RP to the operator provides a prompt to the operator to perform a driving operation in an appropriate way.

(2) The driving operation assisting system 1 provides a precise conveyance of information to the operator by using the accelerator pedal 61 as the operator controlled input device and the seat 71 as the vehicle mount equipment because the accelerator pedal 61 and seat 71 are frequently associated with the operator.

(3) As shown in FIG. 10, the increase ΔFp in the reaction force from the accelerator pedal 61 is kept unchanged, i.e., ΔFp=0, when the risk potential RP falls in the low risk region, while the reaction force ΔFc from the front edge portion 72a of the seat 71 is kept unchanged, i.e., ΔFc=ΔFc1, when the risk potential RP falls in the high risk region. This arrangement prevents the operator from becoming confused due to simultaneous varying of haptic inputs from two different tools of transmission of information.

Second Exemplary Embodiment

Figure 12:
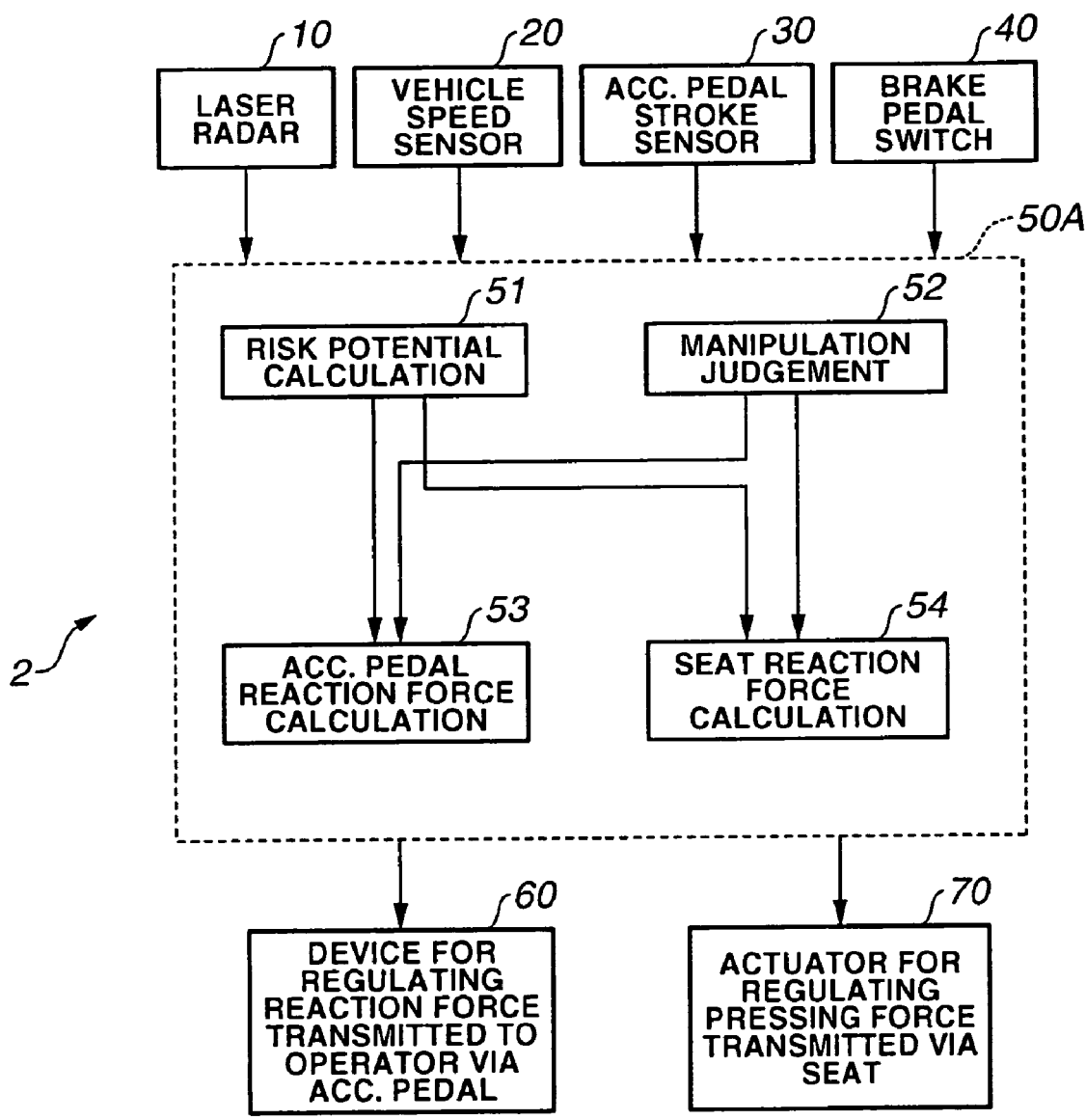
FIG. 12 is a block diagram incorporating a second exemplary embodiment of a system and method for assisting driving operation of an operator operating a vehicle according to the present disclosure.

Referring to FIG. 12, a second exemplary embodiment of this disclosure is depicted. In FIG. 12, the reference numeral 2 generally denotes the driving operation assisting system. The second exemplary embodiment shown in FIG. 12 and the preceding embodiment shown in FIGS. 1 and 2 are substantially the same. Like reference numerals are used to designate like parts or portions throughout FIG. 12 and FIGS. 1 and 2. The following sections provide description on features of this embodiment different from the preceding embodiment.

As different from the driving operation assisting system 1, the driving operation assisting system 2 further comprises a brake pedal switch 40 configured to detect whether or not the operator is manipulating a brake pedal of the own vehicle. A manipulation judgment device 52 of a controller 50A judges the state of the brake pedal in addition to the state of an accelerator pedal 61 (see FIGS. 2 and 3). An accelerator pedal reaction force calculation device 53 and a seat reaction force calculation device 54 calculate an increase ΔFp in reaction force from the accelerator pedal 61 and a reaction force ΔFc from a cushion front edge portion 72a of a driver's seat 71 (see FIGS. 4 and 5) based on risk potential RP calculated at a risk potential calculation device 51 and the states of the accelerator pedal 61 and brake pedal judged at the manipulation judgment device 52.

According to this second exemplary embodiment, the controller 50A calculates appropriate values of the increase ΔFp in reaction force from the accelerator pedal 61 and appropriate values of the reaction force ΔFc from the front edge portion 72a of the seat 71 to the following states A, B and C, and adjusts a rate of change of the reaction force ΔFc during a shift from one of the states A, B and C to another.

State A: the operator is manipulating the accelerator pedal 61;

State B: the operator is manipulating the brake pedal;

State C: the operator is not manipulating both of the accelerator pedal and brake pedal.

Figure 13:
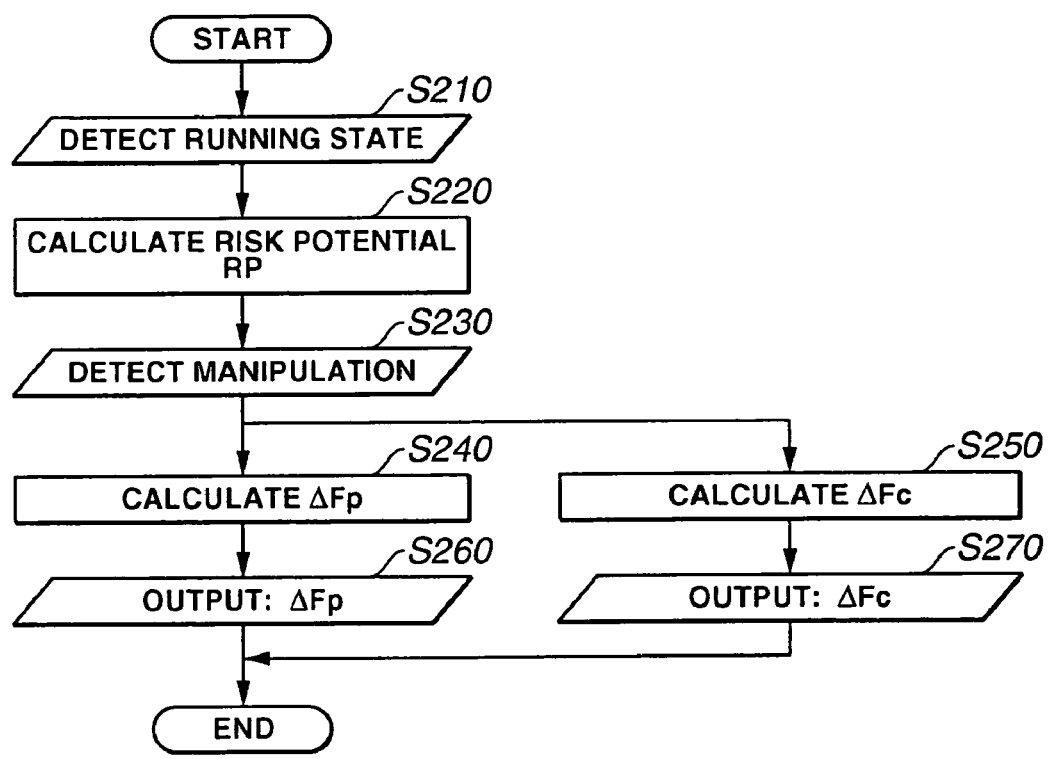
FIG. 13 is a flow chart of a main control routine illustrating an operation of the exemplary embodiment shown in FIG. 12.

FIG. 13 is a flow chart illustrating steps of a driving operation assisting control program stored in the controller 50A. The execution of the control program is repeated at regular intervals of, for example, 50 milliseconds.

In FIG. 13, at step S210, the controller 50A reads in a running state or environment in a field around the own vehicle from laser radar 10 and a vehicle speed sensor 20. At step S220, the controller 50A calculates risk potential RP based on the running state data obtained at step S210 using the equation (Eq. 3).

At step S230, the controller 50A reads in operation amount S of the accelerator pedal 61 from an accelerator pedal stroke sensor 30 and a signal indicative of the state of the brake pedal from the brake pedal switch 40.

At step S240, the controller 50A calculates the increase ΔFp in reaction force from the accelerator pedal 61 based on the risk potential RP obtained at step S220 and the states of the accelerator pedal 61 and brake pedal obtained at step S230. In this exemplary embodiment, similarly to the first exemplary embodiment, the increase ΔFp in reaction force from the accelerator pedal 61 is calculated against the risk potential RP in accordance with the illustrated map in FIG. 8.

At step S250, the controller 50A calculates the reaction force ΔFc from the front edge portion 72a (see FIG. 4) based on the risk potential RP obtained at step S220 and the states of the accelerator pedal 61 and brake pedal obtained at step S230. The details of jobs for calculation of the reaction force ΔFc are further described using a flow chart illustrated in FIG. 14.

Figure 14:
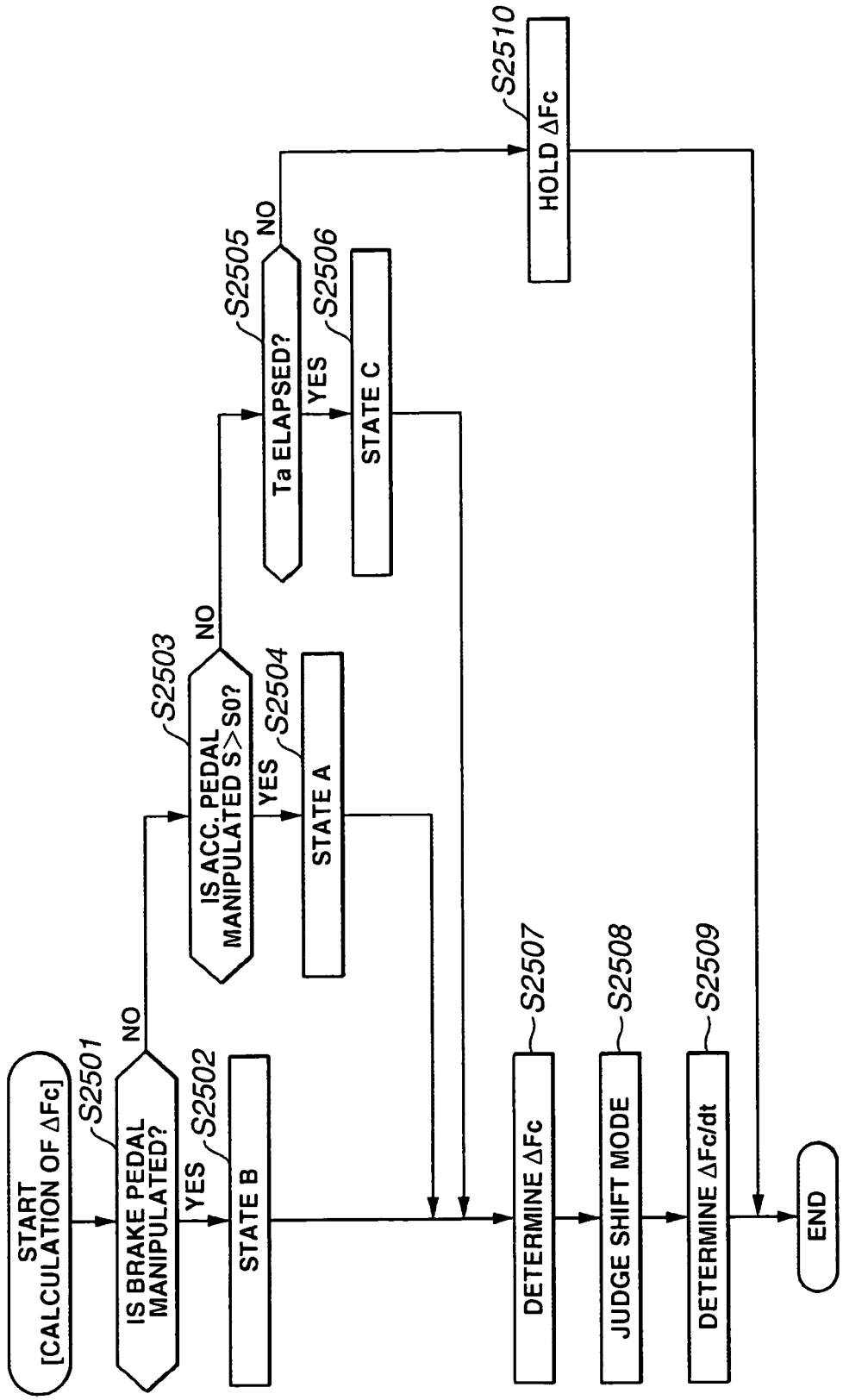
FIG. 14 is a flow chart of a sub-control routine illustrating a calculation of a pressing force $\Delta Fc$ from a front edge portion of a driver's seat.

Referring to the flow chart in FIG. 14, at step S2501, the controller 50A judges whether or not the operator is manipulating the brake pedal based on the signal from the brake pedal switch 40. If the controller 50A judges that the operator is manipulating the brake pedal, the program proceeds to step S2502 where it regards the current state as state B. If the controller 50A judges that the operator is not manipulating the brake pedal, the program proceeds to step S2503 where it judges whether or not the operator is manipulating the accelerator pedal 61 after determining whether or not the current operating amount S of the accelerator pedal 61 is greater than a predetermined value S0. This predetermined value S0 has been determined beforehand after considering a play and the like of the accelerator pedal 61.

If the interrogation at step S2503 results in affirmative, the program proceeds to step S2504 where the controller 50A regards the current state as state A. If the interrogation at step S2503 results in negative, the program proceeds to step S2505 where the controller 50A measures elapse of time T after the operation amount S has dropped down to or below the predetermined value S0 and judges whether or not the measured time T exceeds a predetermined period of time Ta. If the controller 50A judges that the measure time T has exceeded the predetermined period of time Ta, the program proceeds to step S2506 where it regards the current state as state C.

At step S2507, the controller 50A calculates the reaction force $\Delta Fc$ from the front edge portion 72a of the seat 71 based on the risk potential RP and the state determined at step S2502, S2504 and S2506.

Figure 15:
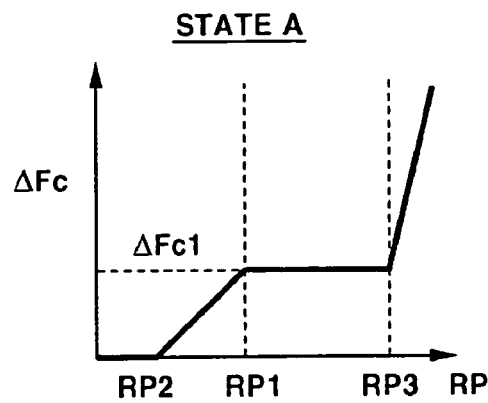
FIG. 15 illustrates, in the fully drawn line, the pressing force $\Delta Fc$ from the front edge portion of the driver's seat changing with different values of a risk potential RP when an operator operation is in state A.

State A (when the operator is manipulating the accelerator pedal): FIG. 15 shows values of the reaction force $\Delta Fc$ from the front edge portion 72a of the seat 71 relative to different values of the risk potential RP in the state A. In a low risk region (RP$\leq$RP1), the reaction force $\Delta Fc$ increases gradually after the risk potential RP has exceeded a predetermined value RP2. In a high risk region (RP >RP1), the reaction force $\Delta Fc$ is set at a fixed, predetermined value $\Delta Fc1$. The reaction force $\Delta Fc$ increases from the predetermined value$\Delta Fc1$ after the risk potential RP has exceeded a predetermine value RP3. The rate of increase of the reaction force $\Delta Fc$ in the high risk region is set greater than that in the low risk region, to transmit to the operator that the risk potential RP is approaching its upper limit. The predetermined value RP3 is a threshold defining a lower boundary of an upper limit boundary region.

Figure 16:
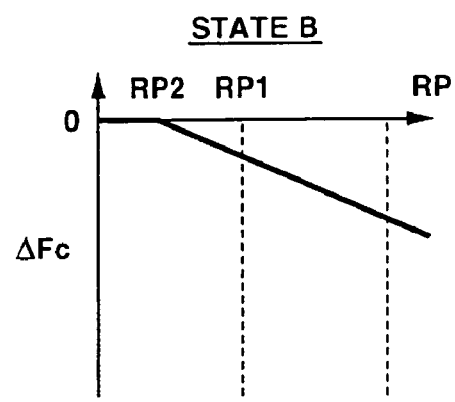
FIG. 16 illustrates, in the fully drawn line, the pressing force $\Delta Fc$ from the front edge portion of the driver's seat changing with different values of the risk potential RP when the operator operation is in state B.

State B (when the operator is manipulating the brake pedal): FIG. 16 shows values of the reaction force $\Delta Fc$ from the front edge portion 72a of the seat 71 relative to different values of the risk potential RP in the state B. As mentioned before, an air bag 721 embedded in the front edge portion 72a of the cushion 72 is pressurized to a standard internal pressure level in the absence of regulation of pressing force in response to the risk potential RP. In the state B when the brake pedal is being manipulated, various minus values are set as the reaction force $\Delta Fc$ relative to different values of the risk potential RP, performing subtraction from the standard internal pressure to reduce the pressing force from the front edge portion 72a.

As shown in FIG. 16, the reaction force $\Delta Fc$ decreases gradually and continuously over the low and high risk regions after the risk potential RP has exceeded the predetermined value RP2. The rate of change of the reaction force $\Delta Fc$ in the state B is set less than the rate of change of the reaction force $\Delta Fc$ in the state A.

Figure 17:
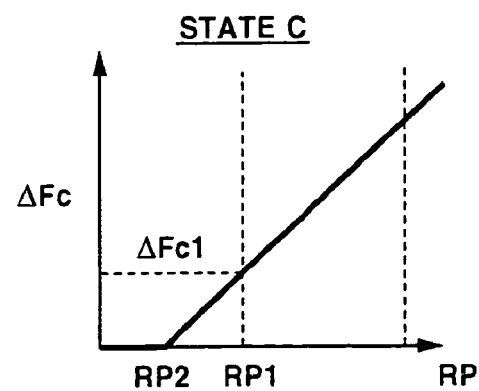
FIG. 17 illustrates, in the fully drawn line, the pressing force $\Delta Fc$ from the front edge portion of the driver's seat changing with different values of the risk potential RP when the operator operation is in state C.

State C (when the operation is not manipulating both accelerator pedal 61 and brake pedal): FIG. 17 shows values of the reaction force $\Delta Fc$ from the front edge portion 72a of the seat 71 relative to different values of the risk potential RP in the state C. The reaction force $\Delta Fc$ from the front edge portion 72a of the seat 71 increases continuously over the low and high risk regions after the risk potential RP has exceeded the predetermined value RP2.

Figure 18:
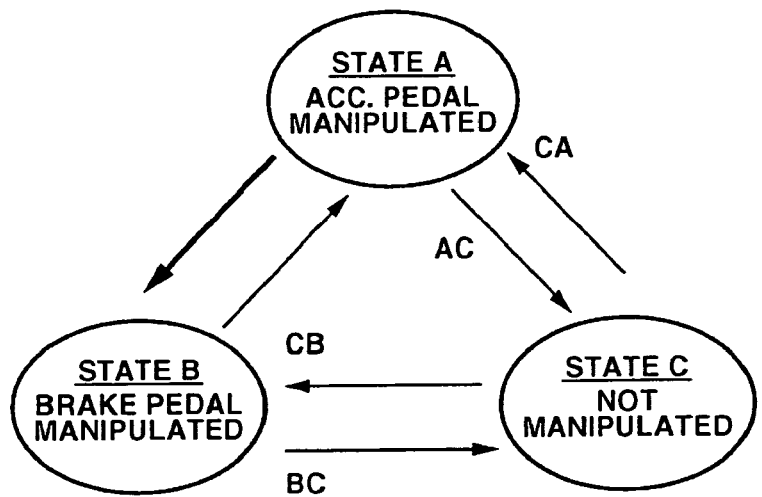
FIG. 18 is a diagram illustrating shift modes between the states A, B and C.

In FIG. 14, at the next step S2508, the controller 50A judges whether or not there is a change between the state determined in the preceding cycle and the state determined in the current cycle and determines a shift mode applicable to a shift to the current state from the previous state. As shown in FIG. 18, four shift modes are considered applicable to various shifts among the states A, B and C. Mode CA is a shift from the state C to the state A. Mode AC is a shift from the state A to the state C. Mode CB is a shift from the state C to the state B. Mode BC is a shift from the state B to the state C. Two shifts between the state A and the state B are out of consideration.

At step S2509, the controller 50A sets the rate of change $\Delta Fc/dt$ of the reaction force $\Delta Fc$ in response to the shift mode that has been set at step S2508.

Figure 19:
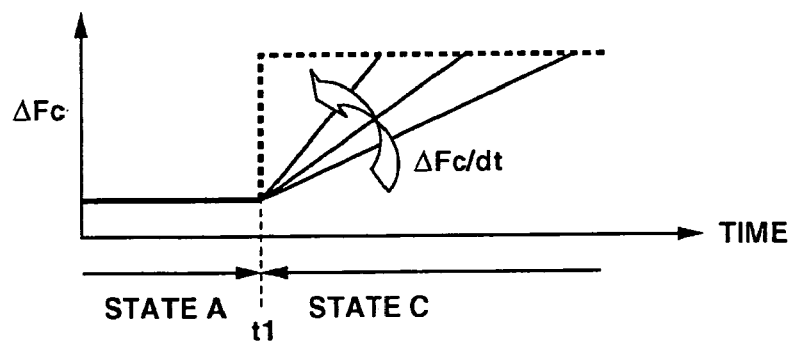
FIG. 19 illustrates, in the fully drawn line, the pressing force $\Delta Fc$ changing with time during transient from the state A.

Considering now, for example, the mode AC from the state A to the state C in the high risk region, a rapid increase in the reaction force $\Delta Fc$ occurs at the moment t1 immediately after a switch from the state A to the state C as shown in FIG. 19. In order to avoid confusion and/or a sense of incompatibility that the operator might have sensed due to a shock caused by the above-mentioned rapid increase in the reaction force $\Delta Fc$, the pressing force from the front edge portion 72a of the cushion 72 of the seat 71 is controlled to vary continuously upon a shift between the states. Accordingly, the controller 50A sets the rate of change $\Delta Fc/dt$ of the reaction force $\Delta Fc$ from the front edge portion 72a in response to the shift mode. Upon a shift between the state A and the state B, the adjustment of the rate of change $\Delta Fc/dt$ is not carried out, allowing a rapid and quick change upon the shift.

Figure 20:
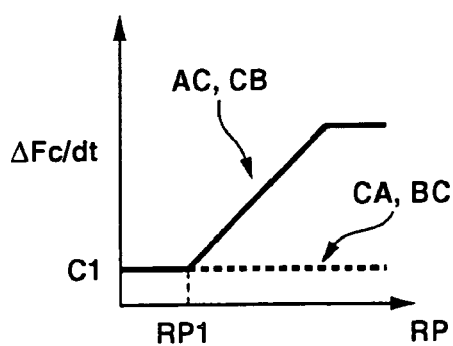
FIG. 20 illustrates, in the fully drawn line, a pressure rate $\Delta Fc/dt$ changing with different values of the risk potential RP for shift modes AC and CB and illustrates, in the broken line, a pressure rate ΔFc/dt changing with different values of the risk potential RP for shift modes CA and BC.

FIG. 20 illustrates values of the manner of setting the rate of change $\Delta Fc/dt$ relative to different values of risk potential RP using shift modes as a parameter. In the low risk region (RP$\leq$RP1), a predetermined value C1 is set as the rate of change $\Delta Fc/dt$ common to all four shift modes AC, CB, CA and BC. In the low risk region when the risk potential RP is relatively small, the reaction force $\Delta Fc$ changes slowly thereby preventing the operator from having a sense of incompatibility.

Upon mode AC or CB, the rate of change $\Delta Fc/dt$ increases as the risk potential RP increases in the high risk region, causing a quick change of the reaction force $\Delta Fc$ to a new value for the new state after the shift.

In mode AC or BC, the rate of change $\Delta Fc/dt$ remains the same as the predetermined value C1 in the high risk region, causing a slow change of the reaction force $\Delta Fc$ to a new value for the new state after the shift. As mode CA reflects a driving operation of depressing the accelerator pedal 61 in the high risk region and mode BC reflects a driving operation of releasing the brake pedal in the high risk region, the controller 50A recognizes that the operator wishes to carry our the driving operation in the high risk region and provides a slow change in the reaction force $\Delta Fc$ thereby preventing the operator from having a sense of incompatibility.

FIG. 21 illustrates a table summarizing a change in the reaction force $\Delta Fc$ for each of the four different modes CA, AC, CB and BC. In mode CA, the reaction force $\Delta Fc$ decreases slowly irrespective of the magnitude of risk potential RP after depression of the accelerator pedal 61. In mode AC, the reaction force $\Delta Fc$ increases slowly in the low risk region, but quickly in the high risk region after release of the accelerator pedal 61.

In mode CB, the reaction force ΔFc decreases slowly in the low risk region, but quickly in the high risk region after depression of the brake pedal. In mode BC, the reaction force ΔFc increases slowly irrespective of the magnitude of risk potential RP after release of the brake pedal.

In the preceding manner, the controller 50A varies the reaction force ΔFc from the front region 72a of the seat 71 at the appropriate rate of change ΔFc/dt to the shift mode to a new value for the new state after the shift. In FIG. 14, if the interrogation at step S2502 results in negative so that the measured time T after the operation amount S has dropped to or below the predetermined value S0 is less than the predetermined period of time Ta, the program proceeds to step S2510. At step S2510, the reaction force ΔFc calculated in the last cycle is held or maintained. In concrete terms, the reaction force ΔFc calculated for the state A that was present before the operation amount S dropped to or below the predetermined value S0 is used.

The predetermined period of time Ta is set against different values of risk potential RP as shown in FIG. 22. As shown in FIG. 22, the predetermined period of time Ta increases as the value of risk potential RP decreases, thereby increasing a time of holding the past value of the reaction force ΔFc. As shown in FIG. 23, a shift from the state A to the state C is completed if, upon elapse of the predetermined period of time Ta, the operation amount S of the accelerator pedal S is equal to or less than the predetermined value S0 and the brake pedal is not being manipulated. If the brake pedal is manipulated prior to elapse of the predetermined period of time Ta, a shift is made from the state A to the state B. The frequency of shift from the state A to the state C has been reduced by confirming the conditions allowing the shift to the state C upon elapse of the predetermined period of time Ta.

Turning back to FIG. 13, after calculating the reaction force ΔFc at step S250, at step S260, the controller 50A provides, as an output, the increase ΔFp in accelerator pedal reaction force given at step S240. A first control signal reflecting this increase ΔFp is fed from the controller 50A to an actuator 60, which regulates the reaction force transmitted to the operator from the accelerator pedal 61 by regulating the servo motor 62. At step S270, the controller 50A provides, as an output, the reaction force ΔFc given at step S250. A second control signal reflecting this reaction force ΔFc is fed from the controller 50A to a seat actuator 70, which regulates the pressing force transmitted to the rear of the femoral region of the operator by adjusting the internal pressure of the air bag 721.

Figure 24:
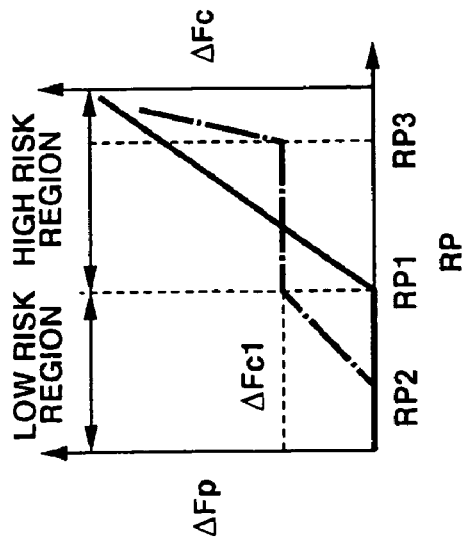
FIG. 24 illustrates, in the fully drawn line, an increase ΔFp in a reaction force from the accelerator pedal changing with different values of risk potential RP, and illustrates, in the one-dot chain line, a pressing force ΔFc from the front edge portion of the driver's seat with different values of risk potential RP when the operator operation is in state A.

The second exemplary embodiment of the diving operation assisting system 2 operates as follows:

In the state A when the operator is manipulating the accelerator pedal 61, as shown by the one-dot chain line in FIG. 24, in the low risk region, the reaction force ΔFc from the front edge portion 72a increases gradually as the reaction force RP increases. In the low risk region, the increase ΔFp in reaction force is always set equal to 0 (ΔFp=0). In the high risk region, as shown by the fully drawn line in FIG. 24, the reaction force ΔFc is set fixedly at the predetermined value ΔFc1, while the increase ΔFp increases gradually as the reaction force RP increases. Further, the reaction force ΔFc increases again after the risk potential RP exceeds the predetermined value RP3.

As described above, in the low risk region, different levels of the risk potential RP is transmitted to the operator only from the non-operation system interface in the form of the front edge portion 72a of the seat 71 without interfering with the operation system interface, providing the information transmission without increasing a sense of incompatibility which the operator might have.

In the high risk region, using the operation system interface in the form of the accelerator pedal 61 has made it possible to give a prompt to the operator to perform driving operation in an appropriate direction of reducing the risk. That is, increasing the reaction force from the accelerator pedal 61 in response to an increase in risk potential RP presses the foot of the operator in a direction toward the released position of the accelerator pedal 61, directly transmitting a need to release the accelerator pedal 61 to the operator. In this circumstance, keeping the pressing force transmitted to the operator from the front edge portion 72a constant reduces the probability of giving confusion and/or a sense of incompatibility to the operator. In the region after the risk potential RP exceeds the predetermined value RP3, the pressing forces from the accelerator pedal 61 and from the front edge portion 72a increase to inform the operator that the risk potential RP is approaching the upper limit boundary.

Figure 25:
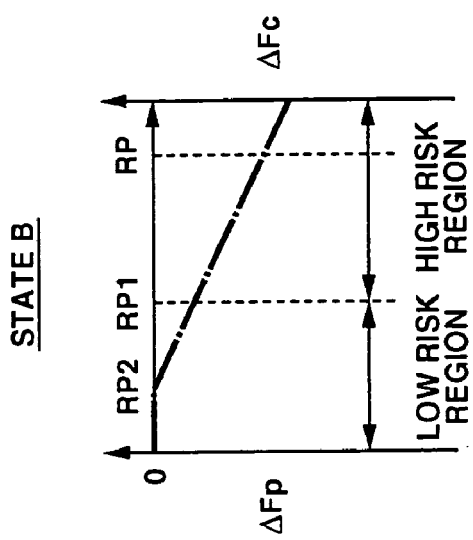
FIG. 25 illustrates, in the one-dot chain line, the pressing force ΔFc from the front edge portion of the driver's seat changing with different values of risk potential RP when the operator operation is in state B.

In the state B when the operator is manipulating the brake pedal, as shown by the one-dot chain line in FIG. 25, the reaction force ΔFc decreases as the risk potential RP increases. A reduction in pressing force from the front edge portion 72a of the seat 71 provides a prompt to the operator to perform an appropriate driving operation to risk within a field around the vehicle by assisting the operator depressing the brake pedal.

Figure 26:
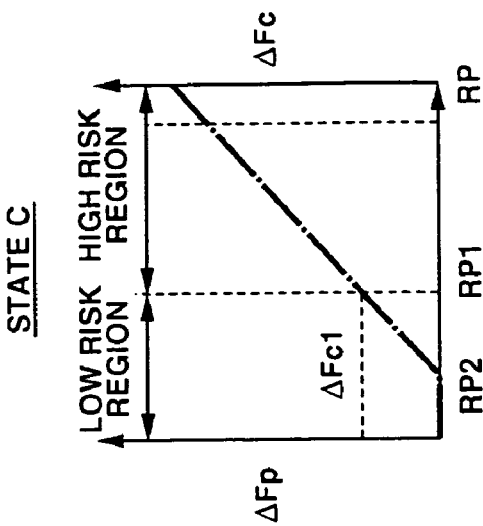
FIG. 26 illustrates, in the one-dot chain line, the pressing force ΔFc from the front edge portion of the driver's seat changing with different values of risk potential RP when the operator operation is in state C.

In the state C when the operator is not manipulating the accelerator pedal 61 and the brake pedal, as shown by the one-dot chain line in FIG. 26, the reaction force ΔFc from the front edge portion 72a increases as the risk potential RP increases thereby ensuring transmission of varying of the risk potential RP to the operator even when the operator is not manipulating the accelerator pedal 61.

As shown by the table in FIG. 21, the rate of change ΔFc/dt of the reaction force ΔFc is set in response to the respective one of shift modes between the states A, B and C so that the pressing force from the front edge portion 72a of the cushion 72 of the seat 71 may vary continuously upon a shift between the states A, B and C. This ensures appropriate information transmission without providing confusion and/or a sense of incompatibility to the operator.

In addition to the effects provided by the first exemplary embodiment, the second exemplary embodiment provides the effects as follows:

(1) As shown in FIG. 24, the increase ΔFp in reaction force from the accelerator pedal 61 is kept invariable, i.e., ΔFp=0, when the risk potential RP falls in the low risk region, while the reaction force ΔFc from the front edge portion 72a of the seat 71 is kept invariable, i.e., ΔFc=ΔFc1, when the risk potential RP falls in the high risk region. This arrangement prevents the operator from getting involved in confusion caused due to simultaneous varying of haptic inputs from two different tools of transmission of information. Further, in the upper limit boundary region exceeding the predetermined value RP3, both the increase ΔFp in reaction force from the accelerator pedal 61 and the reaction force ΔFc from the front edge portion 72a of the seat 71 increase to increase haptic input to the operator, thereby informing the operator that the risk potential is approaching the upper limit.

(2) Adjusting the reaction force ΔFc from the front edge portion 72a of the seat 71 based on the state of the accelerator pedal 61 and the state of brake pedal provides a prompt to the operator to perform driving operation in an appropriate direction. Besides, even in the circumstance when the information transmission via the reaction force from the accelerator pedal 61 is impossible, the reaction force RP can be transmitted to the operator.

(3) As shown by the one-dot chain lines in FIGS. 24 to 26, the reaction force ΔFc from the front edge portion 72a of the seat 71 increases as the risk potential RP increases in the states A and C, while it decreases as the risk potential RP increases in the state B. In this manner, varying of the reaction force RP is transmitted to the operator via the pressing force from the front edge portion 72a of the cushion 72 of the seat 71. Further, the depressing force from the front edge portion 72a is lowered to assist the operator depressing the brake pedal.

Third Exemplary Embodiment

The following sections provide descriptions of a third exemplary embodiment of a driving operation assisting system according to the present disclosure. The third exemplary embodiment is substantially the same as the second exemplary embodiment shown in FIG. 12. The third exemplary embodiment is different from the second exemplary embodiment in the following respects.

Figure 27:
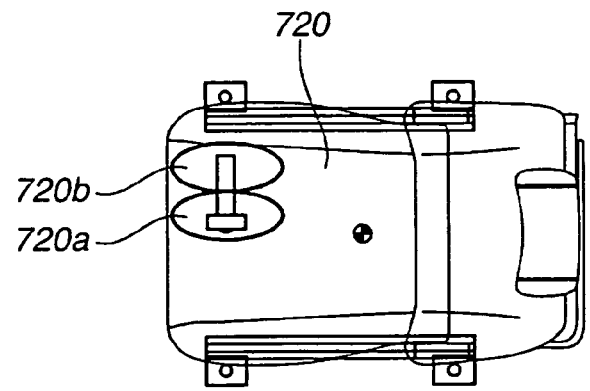
FIG. 27 is a top plan view of a driver's seat incorporating an actuator for regulating pressing force transmitted to an operator from a front edge portion thereof in a third exemplary embodiment according to the present disclosure.
Figure 28:
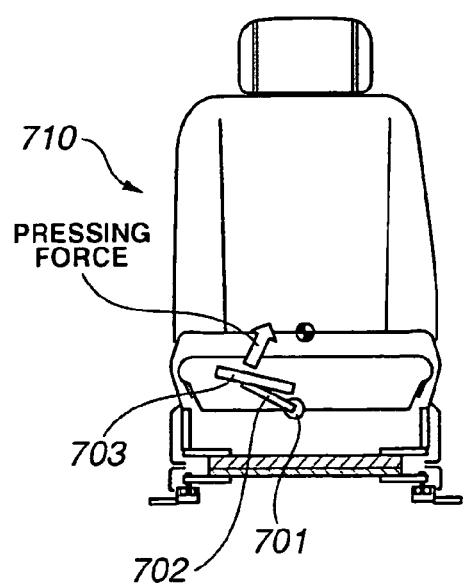
FIG. 28 is a front view of the driver's seat.
Figure 29:
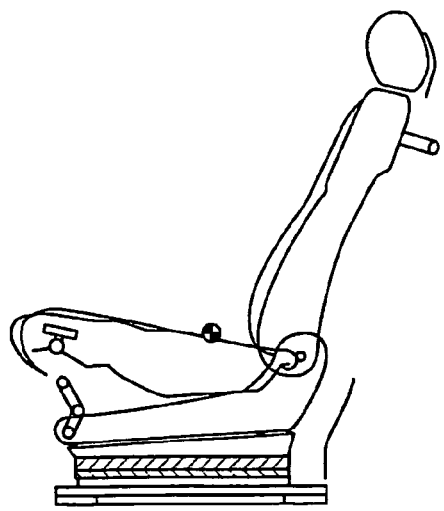
FIG. 29 is a left side view of the driver's seat.

FIGS. 27 to 29 illustrate a seat 710 equipped with a seat actuator 700 according to the third exemplary embodiment. The seat actuator 700 is composed of a motor 701 embedded in a cushion 720 within a front middle portion 720a, and a push plate 703 connected via a link mechanism 702 to the motor 701. Driven by the motor 701, the push plate 703 is moved in a direction as indicated by the illustrated arrow in FIG. 28 thereby applying a pressing force to the rear of the femoral region of the right leg of the operator occupying the seat 710. With the right leg, the operator manipulates the accelerator pedal 61.

The position on the cushion 720 taken by the femoral region of the right leg of the operator slightly varies with state A (for manipulation of the accelerator pedal 61), state B (for manipulation of the brake pedal) and state C (for release of accelerator pedal 61 and brake pedal). To cope with the varying of the position on the cushion 720, the direction in which the push plate 703 moves is adjusted such that the pressing force from the front laterally outward portion 720b is greater that the pressing force from the front middle portion 720a of the cushion 720. The arrangement ensures appropriate transmission of information to the operator via pressing force from the seat 710 without varying the amount of actuation of the seat actuator with difference states A, B and C.

Figure 30:
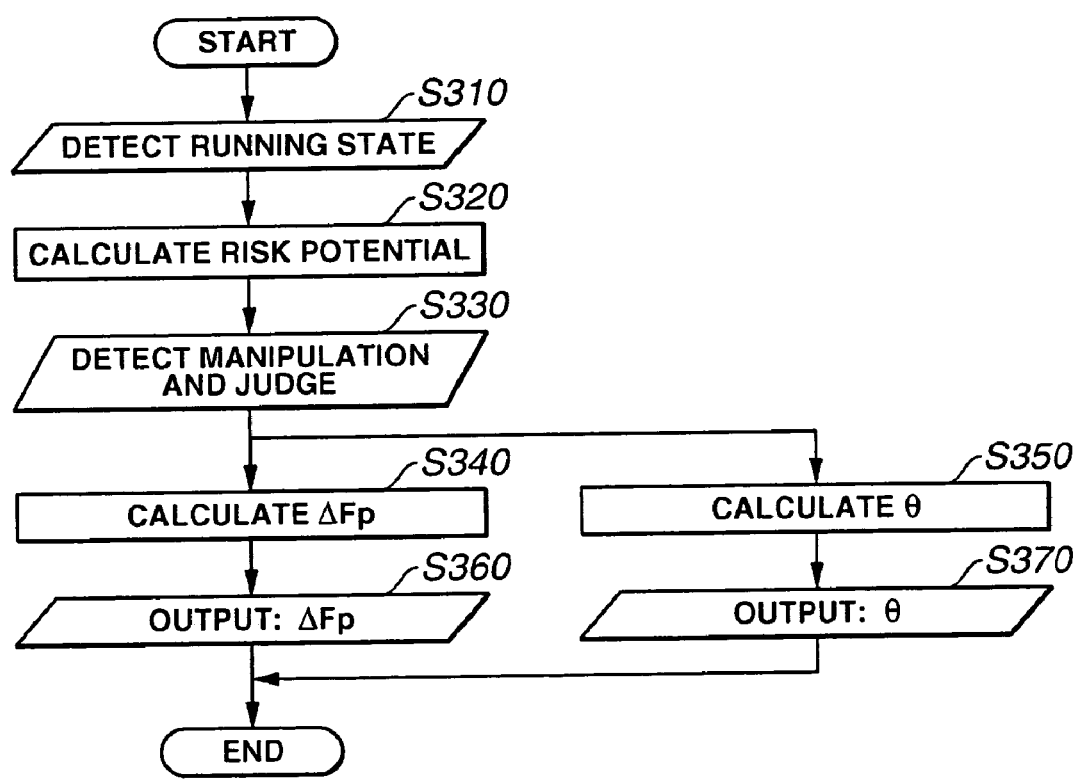
FIG. 30 is a flow chart illustrating an operation of the exemplary embodiment.

Next, the following sections provide more detailed description on the third exemplary embodiment of the driving operation assisting system in connection with FIG. 30. FIG. 30 is a flow chart illustrating steps of a driving operation assisting control program. The execution of the control program is repeated at regular intervals of, for example, 50 milliseconds. This program has steps S310 to S340 and S360, which correspond exactly to the steps S210 to S240 and S260 of the flow chart in FIG. 13.

Figure 31:
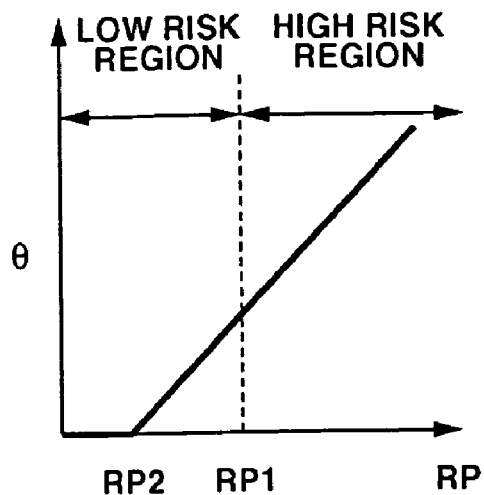
FIG. 31 illustrates varying of a seat motor rotary angle θ with different values of risk potential RP.

In FIG. 30, at step S350, a rotary angle θ of the motor 701 is calculated based on risk potential RP calculated at step S320. FIG. 31 shows varying of the rotary angle θ of the motor 701 with different values of the risk potential RP. As shown in FIG. 31, the motor rotary angle θ increases as the risk potential RP increases beyond the predetermined value RP2.

At step S370, the motor rotary angle θ calculated at step S350 is provided to the seat actuator 700. The motor 701 of the seat actuator 700 is driven to cause generation of pressing forces from the front portions 720a and 720b of the cushion 720.

Figure 32:
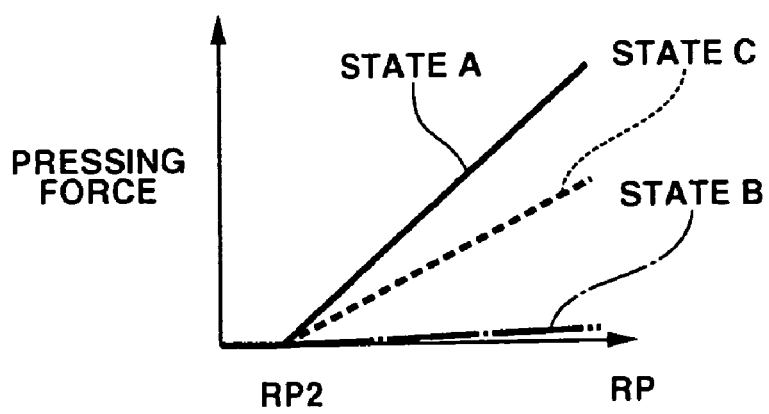
FIG. 32 illustrates, in the fully drawn line, values of a pressing force from a front edge portion of the driver's seat changing with different values of risk potential RP when operator operation is in state A, and in the one-dot chain line, the pressing force changing with different values of risk potential RP when the operator operation is in state B, and illustrates, in the broken line, the pressing force changing with different values of risk potential RP when the operator operation is in state C.

FIG. 32 shows, in the fully drawn line, different levels of pressing force from the cushion 720 relative to different values of the risk potential RP in the state A; in the one-dot chain line, different levels of pressing force from the cushion 720 relative to different values of the risk potential RP in the state B; and, in the broken line, levels of pressing force from the cushion 720 relative to different values of the risk potential RP in the state C. As mentioned before, the femoral region take various positions with different states A, B and C, pressing force transmitted to the femoral region of the right leg of the operation will vary in magnitude with different states A, B and C even if the risk potential is the same and thus the motor rotary angle θ is the same.

In the state A (for manipulation of the accelerator pedal), the femoral region of the right leg of the operator, which manipulates the accelerator pedal, shifts to a position on the front laterally outward portion 720b of the cushion 720. Thus, the pressing force transmitted to the femoral region increases as shown by the fully drawn line in FIG. 32 as the risk potential RP increases. Increasing of the pressing force with the risk potential RP transmits directly to the operator the information that the risk has increased. As the push plate 703 moves in the illustrated direction by the arrow, the pressing force moving the right leg of the operator toward the brake pedal side increases thereby transmitting to the operator a need to depress the brake pedal.

In the state B (for manipulating brake pedal), the femoral region of the right leg of the operator shift laterally inwardly to a position on the front middle portion 720a of the cushion 720. Thus, as shown by the one-dot chain line in FIG. 32, the pressing force remains low even if the risk potential RP increases. Thus, operator manipulating operation of the brake pedal is not interfered. In the state C (for release of the accelerator pedal and brake pedal), the pressing force increases at an intermediate rate between the rate in the state A and the rate in the state B as the risk potential RP increases, thereby transmitting the risk potential RP to the operator via the pressing force from the front portions 720a and 720b of the cushion 720.

In the first to third exemplary embodiments, the risk potential RP is transmitted to the operator via inputs from the operation system interface and the non-operation system interface. The disclosure is not limited to these examples. Transmission of risk potential to the operator via an input from the non-operation system interface in the form of the seat 71 is another example. In this example, the reaction force ΔFc from the front edge portion of the seat may be regulated in the manner described in connection with FIGS. 15 to 17 based on the risk potential RP and states of driving operation by the operator. In this manner, the pressing force from the seat 71 only may provide a prompt to the operator to perform appropriate driving operation as well as transmitting varying of the risk potential RP to the operator.

In the first and second exemplary embodiments, as shown in FIGS. 4 and 5, the pressing force transmitted to the rear of the femoral region of the leg from the seat 71 is adjusted by varying the internal pressure of the air bag 721 embedded in the cushion 72 below the front edge portion 72a. The present disclosure is not limited to this example. Using the motor and push plate as described in connection with the third exemplary embodiment is another example. Controlling the motor rotary angle can transmit the risk potential RP to the operator via the pressing force applied to the rear of the femoral region of the leg from the seat cushion. A lift motor to left the cushion 72 may be used to transmit the risk potential to the operator.

In the first to third exemplary embodiments, the risk potential RP with respect to the preceding vehicle is calculated using the time to collision TTC and time threshold THW. The calculation to give the risk potential RP is not limited to this example. The reciprocal of the distance D or the reciprocal of the time to collision TTC may be used as the risk potential RP.

In the first to third exemplary embodiments, the laser radar 10 and the vehicle speed sensor 20 constitute the running environment detection assembly. The risk potential calculation device 51 functions as the risk potential calculating means. The actuator 60 for regulating reaction force transmitted to operator via accelerator pedal functions as the reaction force generating means. The seat actuator 70 for regulating pressing force transmitted to operator via seat functions as the pressing force generating means. The accelerator pedal reaction force calculation device 53 and the seat reaction force calculation device 54 function as the controlling means. The seat reaction force calculation device 54 functions as the pressing force adjusting means or the pressing force regulating means.

Although the disclosure has been shown and described with respect to the exemplary embodiments, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A system for assisting a driver in operating a vehicle, the system comprising:
   a detection assembly configured to obtain environment information related to an environment around the vehicle;
   a risk potential calculation device configured to calculate risk potential associated with the vehicle based on the environment information;
   an operator controlled input device used by the driver to enter a control input to operate the vehicle;
   equipment of the vehicle that is different from the operator controlled input device and not used by the driver in entering the control input to operate the vehicle;
   a reaction force generator configured to regulate a reaction force transmitted to the driver via the operator controlled input device in response to a first control signal when the driver is manipulating the operator controlled input device;
   a pressing force generator configured to regulate a pressing force transmitted to the driver via the equipment of the vehicle in response to a second control signal; and
   a controller configured to generate the first control signal so as to vary the reaction force with different values of the calculated risk potential when the calculated risk potential falls in a high risk region, and to generate the second control signal so as to vary the pressing force with different values of the calculated risk potential when the calculated risk potential falls in a low risk region.

2. The system as claimed in claim 1, wherein the operator controlled input device is an accelerator pedal, and the equipment is a driver's seat occupied by the driver.

3. The system of claim 1, wherein:
   the reaction force transmitted to the driver via the operator controlled input device remains substantially unchanged with different values of the risk potential when the calculated risk potential falls in the low risk region; and
   the pressing force transmitted to the driver via the equipment remains substantially unchanged with different values of the risk potential when the calculated risk potential falls in the high risk region.

4. The system of claim 3, wherein the pressing force is transmitted to the driver via the equipment according to different values of the calculated risk potential when the calculated risk potential falls in an upper limit boundary portion of the high risk region.

5. The system as claimed in claim 2 further comprising:
   a manipulation judgment device configured to judge an operation state of the accelerator pedal being manipulated by the driver and an operation state of a brake pedal being manipulated by the driver, wherein the pressing force is regulated in response to the judged operation state of the accelerator pedal and the judged operation state of the brake pedal.

6. The system as claimed in claim 5, wherein:
   when a judgment result of the manipulation judgment device indicates that the accelerator pedal is being manipulated or both of the accelerator pedal and brake pedal are not being manipulated, the pressing force transmitted to the driver via the driver's seat increases as the risk potential increases; and
   when the judgment result of the manipulation judgment device indicates that the brake pedal is being manipulated, the pressing force transmitted to the driver via the driver's seat drops as the risk potential increases.

7. A system for assisting a driver in operating a vehicle, wherein the driver manipulates an accelerator pedal with a foot of a predetermined leg of the driver in order to enter a control input for operating the vehicle, the system comprising:
   a detection assembly configured to detect a running environment around the vehicle;
   a judgment device configured to judge whether the driver is manipulating the accelerator pedal;
   a risk potential calculation device configured to calculate risk potential associated with the vehicle based on the detected running environment;
   a driver's seat occupied by the driver;
   a reaction force generator configured to regulate a first force applied to the foot of the predetermined leg of the driver via the accelerator pedal in response to a first control signal;
   a pressing force generator configured to regulate a second force applied to a rear of a femoral region of the predetermined leg of the driver via the driver's seat in response to a second control signal; and
   a controller configured to generate the first and second control signals such that, when the driver is manipulating the accelerator pedal, a sense of a low risk region of the calculated risk is conveyed to the driver by varying the second force with different values of the calculated risk potential, and a sense of a high risk region of the calculated risk potential is conveyed to the driver by varying the first force with different values of the calculated risk potential.

8. A vehicle incorporating the system of claim 1.

9. A vehicle including the system of claim 7.

10. A system for assisting a driver in operating a vehicle, wherein the driver manipulates an accelerator pedal with a foot of a predetermined leg of the driver in order to enter a control input for operating the vehicle, the system comprising:
   detection means for detecting a running environment around the vehicle;

judgment means for judging whether the driver is manipulating the accelerator pedal;

calculation means for calculating risk potential associated with the vehicle based on the detected running environment;

a driver's seat occupied by the driver;

a reaction force generator configured to regulate a first force applied to the foot of the predetermined leg of the driver via the accelerator pedal in response to a first control signal;

a pressing force generator configured to regulate a second force applied to a rear of a femoral region of the predetermined leg of the driver via the driver's seat in response to a second control signal; and controller means for generating the first and second control signals such that, when the driver is manipulating the accelerator pedal, a sense of a low risk region of the calculated risk is conveyed to the driver by varying the second force with different values of the calculated risk potential, and a sense of a high risk region of the calculated risk potential is conveyed to the driver by varying the first force with different values of the calculated risk potential.

11. The system of claim 7, wherein the judgment device is configured to judge whether the driver is manipulating a brake pedal of the vehicle, and wherein, when the judgment device judges that the driver is manipulating the brake pedal, the senses of the low and high risk regions of the calculated risk potential are transmitted to the driver by varying the second force with different values of the calculated risk.

12. The system of claim 7, wherein, the judgment device judges that the driver is not manipulating both the accelerator and brake pedals, the senses of the low and high risk regions of the calculated risk potential are transmitted to the driver by varying the second force with different values of the calculated risk.

* * * * *